United States Patent [19]

[11] 3,909,795

Chang et al.

[45] Sept. 30, 1975

[54] PROGRAM TIMING CIRCUITRY FOR CENTRAL DATA PROCESSOR OF DIGITAL COMMUNICATIONS SYSTEM

[75] Inventors: Gregory I. Chang, Oak Park; Rolfe E. Buhrke, La Grange Park; Donald L. Schulte, Oak Park; John A. Wilber, Elk Grove Village, all of Ill.

[73] Assignee: GTE Automatic Electric Laboratories Incorporated, Northlake, Ill.

[22] Filed: Aug. 31, 1973

[21] Appl. No.: 393,542

[52] U.S. Cl. ........................ 340/172.5; 340/146.1 D

[51] Int. Cl.[2] ........................................... G06F 1/04

[58] Field of Search ........... 340/172.5, 146.1; 444/1

[56] References Cited

UNITED STATES PATENTS

| | | | |
|---|---|---|---|
| 3,623,011 | 11/1971 | Baynard, Jr. et al. | 340/172.5 |
| 3,623,017 | 11/1971 | Lowell et al. | 340/172.5 |
| 3,623,019 | 11/1971 | Groth | 340/172.5 |
| 3,633,181 | 1/1972 | Sikorsky | 340/172.5 |
| 3,701,973 | 10/1972 | Pfordten | 340/172.5 |
| 3,715,728 | 2/1973 | Fontaine | 340/172.5 |
| 3,723,975 | 3/1973 | Kurtz, Jr. et al. | 340/172.5 |

*Primary Examiner*—Gareth D. Shaw
*Assistant Examiner*—John P. Vandenburg
*Attorney, Agent, or Firm*—John T. Winburn

[57] ABSTRACT

Circuitry is disclosed for monitoring the execution of programs in a central processor of a digital communications system. For recovery programs under the normal mode the program must "punch in" with a recovery program timer at designated intervals, or the circuitry generates a system error level signal. In a special mode, punch in may occur at any time prior to a designated time. Further, for programs other than recovery programs, an error bistable circuit monitors the output of a real time timer which is incremented every basic order time (i.e., machine cycle time) and which will cause the system to enter a recovery phase if it overflows prior to its being reset.

11 Claims, 39 Drawing Figures

CENTRAL PROCESSOR FUNCTIONAL INTERFACE BLOCK DIAGRAM

DPC BLOCK DIAGRAM

CONFIGURATION CONTROL CIRCUIT

MAINTENANCE ACCESS CIRCUIT

TLCC COUNTER CIRCUITS

RCFL = $\overline{\text{CPACL}}$ $\overline{\text{ITCCL}}$ (TO RESET COUNTERS, RCFL = 0)

TLCC OUTPUT STAGE

TIMING LEVEL ERROR INDICATING FLIP-FLOP (TLEIF)

TIMING DIAGRAM OF TLCC COUNTERS

AT THE END OF T7PL OR T7AL. THE OUTPUTS OF ALL COUNTER FLIP-FLOPS SHOULD BE "0".

RECOVERY PROGRAM TIMER

RECOVERY PROGRAM COUNTER ADD-ONE CIRCUIT (RPAOC)

RECOVERY PROGRAM REGISTER (RPR)

RECOVERY PROGRAM TIMER's CONTROL LOGIC CIRCUIT

RECOVERY PROGRAM TIMER ERROR LEVEL CIRCUIT

REAL-TIME TIMER ERROR INDICATOR FLIP-FLOP (RTEIF)

ERROR INDICATOR FLIP-FLOP RESET CONTROL

PROGRAM TIMING CIRCUITRY FOR CENTRAL DATA PROCESSOR OF DIGITAL COMMUNICATIONS SYSTEM

BACKGROUND AND SUMMARY

The present invention relates to digital communication systems; and more particularly, it relates to digital communications systems which employ central data processors.

One such data processor is disclosed in copending, co-owned application of Brenski, et al., entitled "Control Complex for TSPS Telephone System", Ser. No. 289,718, filed Sept. 15, 1972 now U.S. Pat. No. 3,818,455. The subject matter of said application is incorporated herein by reference. Further, the subject matters of the following applications relate to and further describe the central processor, and they further relate to the instant invention and are incorporated herein by reference:

1. Chang, et al., "Timing Monitor Circuit for Central Data Processor of Digital Communications System", Ser. No. 353,915, filed Apr. 23, 1973 now U.S. Pat. No. 3,810,121;
2. Schulte, et al., "Maintenance Access Circuit for Central Processor of Digital Communications System", Ser. No. 320,020, filed Jan. 2, 1973 now U.s. Pat. No. 3,806,887; and
3. Wilber, et al., "System for Reconfiguring Central Processor and Instruction Storage Combinations", Ser. No. 341,428, filed Mar. 15, 1973 now U.S. Pat. No. 3,828,321.

In brief, the circuitry of the present invention monitors the timing levels (which occur in the form of pulses) in a digital communication system having duplicate central processors. Only one of the central processors is active in any given time, and it, therefore, provides the timing levels for both central processors, the other being referred to as a "standby".

Duplicate central processors are provided for reliability— that is, in the event that one processor is not operating properly and an error is detected, the other central processor will be switched on the active state so that the first central processor may be diagnosed.

The principal method by which errors are detected in a central processor is by matching the contents of corresponding circuits in the two processors. Since matching is the primary method of error detection, it is very important that the two central processors be operating on the same time base. Each processor contains a timing generator circuit, the primary timing source of which is a crystal clock pulse generator. However, the timing generator circuits are more complex than a simple clock pulse generator, as disclosed in the above-referenced application Ser. No. 353,915. For example, provisions are made for controlling each timing level individually by program for diagnostic purposes. A "Timing Level" is an individual timing pulse; and there are eight timing pulses, occurring in timed sequence, for each Basic Order Time of the machine. A Basic Order Time is nominally 4.0 microseconds, and each timing level is a pulse that occurs for 0.4 microseconds. Further, at each timing level there is an Accept Level for receiving data, and a Place Level; normally used to transmit data or read it out.

Hence, the present invention relates to timing monitor circuitry. The circuitry senses the repetition rate of a given timing level (for example, timing level 3 which is referred to as TL3) and generates an error signal if the periodic pulses occur at intervals more than a predetermined time apart. Further, the circuitry checks all individual place and accept levels from the timing generator circuit to insure that they occur in the proper sequence and no place or accept levels are missing.

Circuitry is also disclosed for monitoring the execution of programs in the central processor. A recovery program is one which is executed during a recovery phase of operation— that is, after a major error has been detected in the central processor. In the normal mode, the recovery program must "punch in" with a recovery program timer at designated intervals, or the circuitry generates a system error level signal. In the special mode, a punch in may occur at any time prior to a designated time. A punch in is the execution of a program instruction which simply resets a bistable circuit. Further, an error bistable circuit monitors the output of a real time timer which is incremented every basic order time and which will cause the system to enter a recovery phase if it overflows, thereby indicating an error has occurred, either in the hardware or in the program being executed.

THE DRAWING

DETAILED DESCRIPTION

I. INTRODUCTION—TSPS

Figure 1:
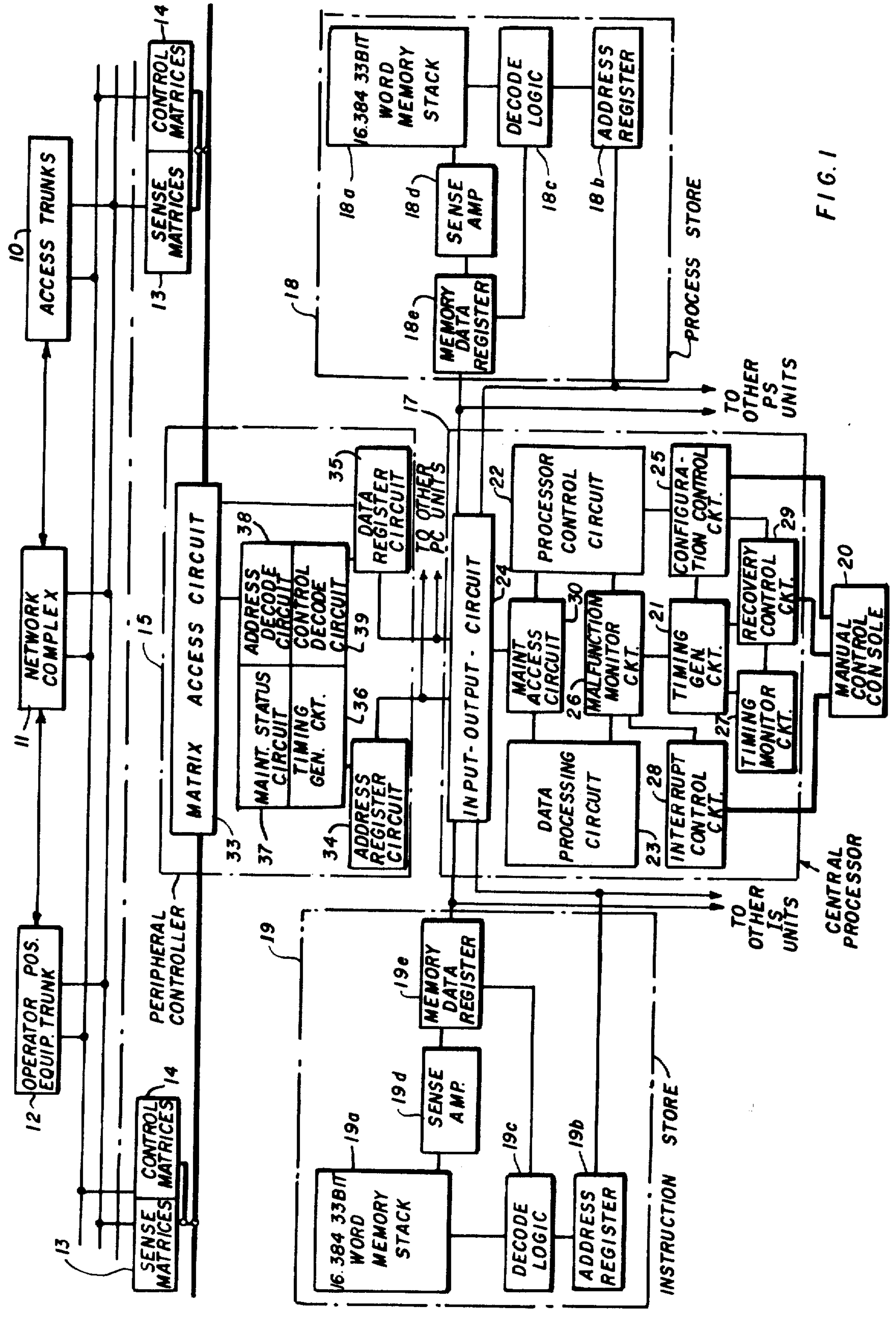
FIG. 1 is a functional block diagram of a TSPS System including a Control and Maintenance Complex.

The primary function of the TSPS System is to provide data processor control of the various functions in toll calls which in the past have been performed by operators but have not required the exercise of discretion on the part of the operator. At the same time, the system must permit operator intervention, as required. Thus, various trunks from an end office to a toll center pass through the TSPS System, and these are commonly referred to as Access Trunks, functionally illustrated in FIG. 1 by the block 10.

The access trunks 10 are connected to and pass through access trunk circuits in a network complex 11 which is physically located at the same location as the TSPS base unit, and the network complex 11 permits the system to access each individual trunk line to open it or control it, or to signal in either direction. There is no switching or re-routing of trunks or calls at this location. Each trunk originating at a particular end office is permanently wired to a single termination in a remote toll office while passing through a TSPS network complex or trunk circuit en route.

The various access trunks may originate at different end offices, but regardless of origin, they are served in common by the TSPS System and the operators and traffic office facilities associated with that system. Hence, the equipment interfaces with various auxiliary equipment incidental to gaining access to the through-put access trunks, including remote operator positions, equipment trunks, magnetic tape equipment for recording charges, and various other equipment diagrammatically illustrated by the block 12. Additional details regarding the network lines 12 for a TSPS system may be obtained from the *Bell System Technical Journal* of December 1970, vol. 49, No. 10.

The present invention is more particulary directed to one aspect of the data processor which controls the telephony—namely the maintenance circuitry in the Central Processor (CP) which controls the system and performs call processing as well as maintenance and recovery functions. The Central Processor is shown in simplex form within the chain block 17 of FIG. 1.

It will be observed that the telephony equipment is about three orders of magnitude in time slower, on the average, than is necessary to execute individual instructions in modern high-speed digital computers. For example, for the present system a clock increment for the Central Processor is 4 microseconds whereas the trunk circuits are sampled every 10 milliseconds. Hence many functions can be performed in the Central Processor, including internal and external maintenance, table look-ups, computations, monitoring of different access trunks, system recovery from a detected fault, etc. between the expected changes in a given trunk.

The TSPS System uses a stored program control as a means of attaining flexibility for varied operating conditions. Reliability is attained by duplicating hardware wherever possible. A stored program control system consists of memories for instructions and data and a processing unit which performs operations, dictated by the stored instructions, to monitor and control peripheral equipment.

A Control and Maintenance Complex (CMC) contains the Instruction Store Complex (IS*), Process Store Complex (PS*), Peripheral Unit Complex (PC*), and the Central Processor Complex (CP*). The asterisk designates all of the circuitry associated with a complex, including the duplicate copy, if applicable.

The interface between the telephony equipment and the data processor is the Peripheral Unit Complex which includes a number of sense matrices 13 and control matrices 14 together with a Peripheral Controller diagrammatically indicated by the chain block 15.

The principal elements of the data processing circuitry include the Central Processor (CP) 17, a Process Store (PS) enclosed within the chain block 18, and an Instruction Store (IS) enclosed within the chain block 19. A computer operator or maintenance man may gain manual access into the Central Processor 17 by means of a manual control console 20, if desired or necessary.

The Instruction Store (IS) 19 which consists of two copies, contains the stored programs. Each copy has up to eight units as shown in block 19 and includes two types of memory:

1. A read-only unit 19*a* containing a maximum of 16,384 thirty-three bit words.

2. Core Memory in remaining units containing a maximum of seven units of 16,384 thirty-three bit words per unit. Individual words are read from or written into IS by CP 17, as will be more fully described below.

Each IS unit 19 of the eight possible is similar; and they are of conventional design including an Address Register 19*b* receiving digital signals representative of a particular word desired to be accessed (for reading or writing as the case may be). This data is decoded in the Decode Logic Circuit 19*c;* and the recovered data is sensed by sense amplifiers 19*d* and buffered in a Memory Data Register 19*e* which also communicates with the Central Processor 17.

The Process Store (PS) 18 contains call processing data generated by the program. The PS (also in duplicate copies) comprises Core Memory units 18*a* containing a maximum of eight units of 16,384 thirty-three bit words for each copy. Individual words are read from or written into PS by CP in a manner similar to the accessing of the Instruction Store 19, just described. That is, an Address Register 18*b* receives the signals representative of a particular location desired to be accessed; and this information is decoded in a conventional Decode Logic Circuit 18*c*. The recovered information is sensed by sense amplifiers 18*d* and buffered in Memory Data Register 18*e*.

The CMC communicates with the telephony and switching equipment through matrices 13, 14 of sense and control devices. Any number of known design elements will work insofar as the instant invention is concerned. The sense and control matrices 13, 14 are each organized into 32 bit sense words and 32 bit control words. On command of CP, PC samples a sense word and returns the values of the 32 sense points to CP. Each control point is a bistable switch or device. To control telephone and input/output equipment, CP sets a word of control points through PC. PC together with the sense and control matrices comprise the Peripheral Unit Complex (PU).

CP sequentially reads and executes instructions which comprise the program, from IS. The CP reads and executes most instructions in 4 microseconds (one machine cycle time). Those instructions that access IS require 8 microseconds require two machine cycles to be executed and are referred to as "dual cycle" instructions.

The instructions obtained from the IS can be considered "Directives" to the CP specifying that it is to perform one of the following operations:

a. Change and/or transfer information inside the CP in accordance with some fixed rule.

b. Communicate with the IS or PS by requesting the IS/PS to either;

1. Read a 33 bit word from a specified location, or
2. Write a 33 bit word into a specified location.

c. Communicate with PC by requesting PC to either;

1. Read a specified 32 bit from sense point word, or
2. Write into a specified 32 bit control point word.

d. Perform maintenance operations internal to CP by either;

1. Reading from a maintenance sense group, or
2. Writing into a maintenance control group.

The Control and Maintenance Complex may be viewed from two levels: a processing level and a maintenance level. At the processing level (which includes the control and maintenance of the telephone equipment) the CMC appears to be an unduplicated, single processor system as in FIG. 1. At the maintenance level (which here refers only to CMC maintenance) the CMC consists of duplicated copies of the units in each complex, as seen in FIG. 2.

The duplication within the CMC is provided for three purposes:

1. In the event that a failed unit is placed out-of-service, its copy provides continued operation of the CMC.
2. Matching between copies provides the primary means of detecting failures.
3. In-service units can be used to diagnose an out-of-service unit and report the diagnostic results.

Each complex within the CMC may be reconfigured (with respect to in-service and out-of-service units) independently of the other complexes to provide higher overall CMC reliability.

The CMC operation is monitored by internal checking hardware. In the event of a malfunction (misbehavior due either to noise or to failure), the CP is forced into the execution of a recovery program by a maintenance interrupt.

When the malfunction is due to failure, the recovery program will find the failed copy and place it out-of-service. When at least one complete set of units in each complex can be placed in-service, the fault recovery program will terminate after reconfiguring the CMC to an operational system. If a good set of units in each complex cannot be found, the fault recovery program continues until manual intervention occurs.

To facilitate the recovery operation, a hierarchy of in-service copies are defined:

1. One Central Processor must always be in the active state, only the active CP can change the configuration of the CMC,
2. If the other CP is in-service, that CP is the standby CP, and
3. The in-service copies of Instruction Store, Process Store, and Peripheral Control Units are designated as primary and secondary where the primary copies are associated with the active CP.

Each Peripheral Control Unit may also be designated as active or standby; only the active Peripheral Control Unit controls telephone equipment through the sense and control points. Further, the duplicate copies of IS are designated active and standby according to which one (called the "active" one) is associated with the primary CP.

II. The Central Processor—An Overview

The CP circuits provide two specific functions: processing and maintenance. The processing circuits provide a general purpose computer without the ability to recover from hardware failures. The maintenance circuits together with the processing circuits provide the CMC with recovery capability.

The Central Processor is divided into ten circuits. The first four provide the processing function.

1. Timing Generator Circuit (TGC), designated 21,
2. Processor Control Circuit (PCC), 22,
3. Data Processing Circuit (DPC), 23, and
4. Input/Output Circuit (IOC), 24.

The above four processing circuits are described herein only to the extent necessary to understand the present invention. Additional details may be found in the copending, co-owned application of Brenski, et al., entitled "Control Complex for TSPS Telephone System", filed Sept. 15, 1972, and assigned Ser. No. 289,718. The subject matter of this application is incorporated herein by reference.

The remaining circuits in the CP provide the maintenance function and these include:

5. Configuration Control Circuit (CCC) 25,
6. Malfunction Monitor Circuit (MMC) 26,
7. Timing Monitor Circuit (TMC) 27,
8. Interrupt Control Circuit (ICC) 28,
9. Recovery Control Circuit (RCC) 29, and
10. Maintenance Access Circuit (MAC) 30.

In FIG. 2, there is shown duplicate copies of each of the above circuits in the Central Processor, with like circuits having identical reference numerals.

Turning back to FIG. 1, a pair of Peripheral Controllers is associated with each Peripheral Control Unit (PCU). Each Peripheral Controller 15 includes the following circuits which are also described in more detail in the above-referenced Brenski, et al. application Ser. No. 289,718:

1. A Matrix Access Circuit 33,
2. An Address Register Circuit 34,
3. A Data Register Circuit 35,
4. A Timing Generator Circuit 36,
5. A Maintenance Status Circuit 37,
6. An Address Decode Circuit 38, and
7. A Control Decode Circuit 39.

Figure 2:
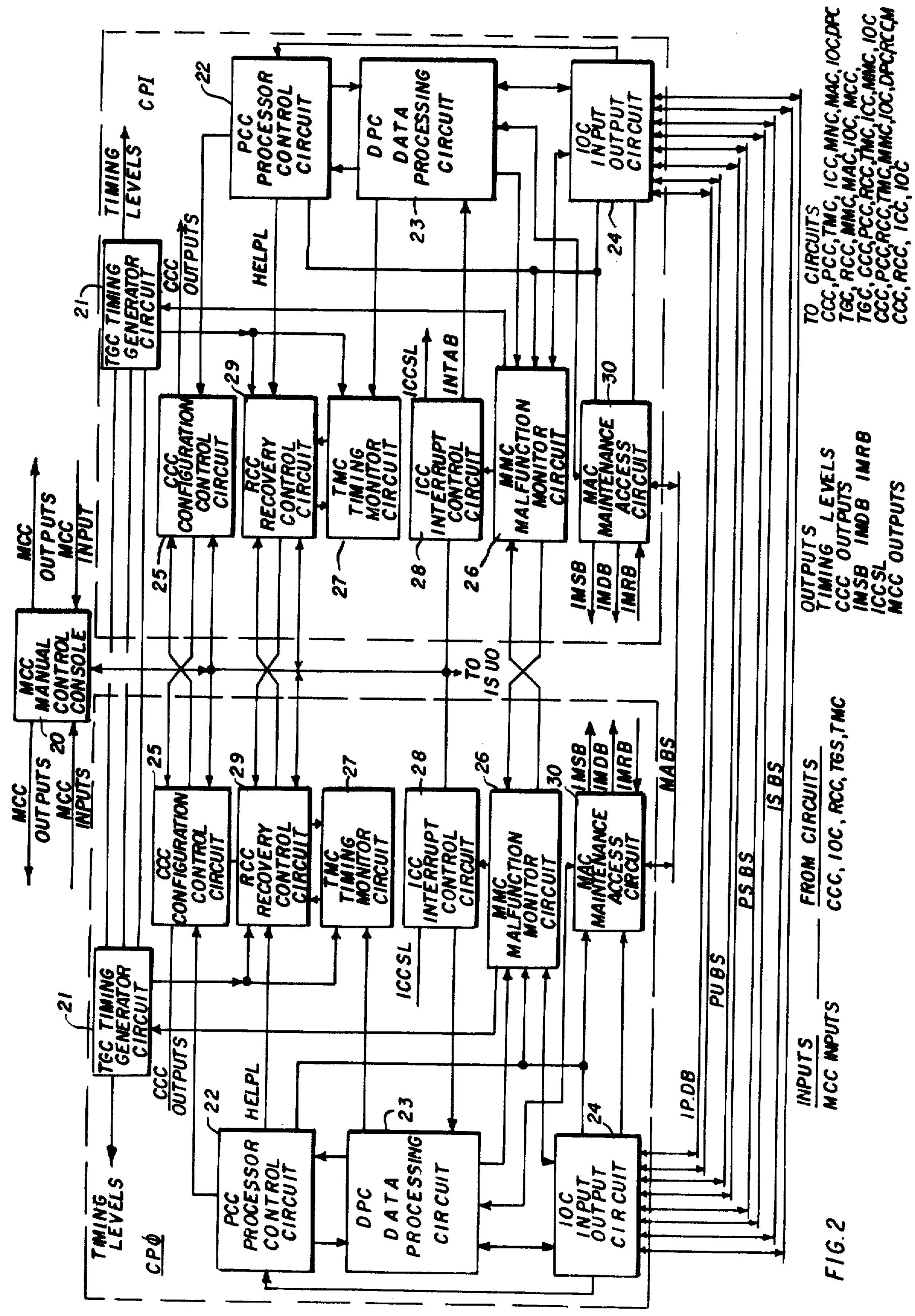
FIG. 2 is a functional block diagram showing redundant copies of the Central Processor and their associated busing systems.
Figure 2A:
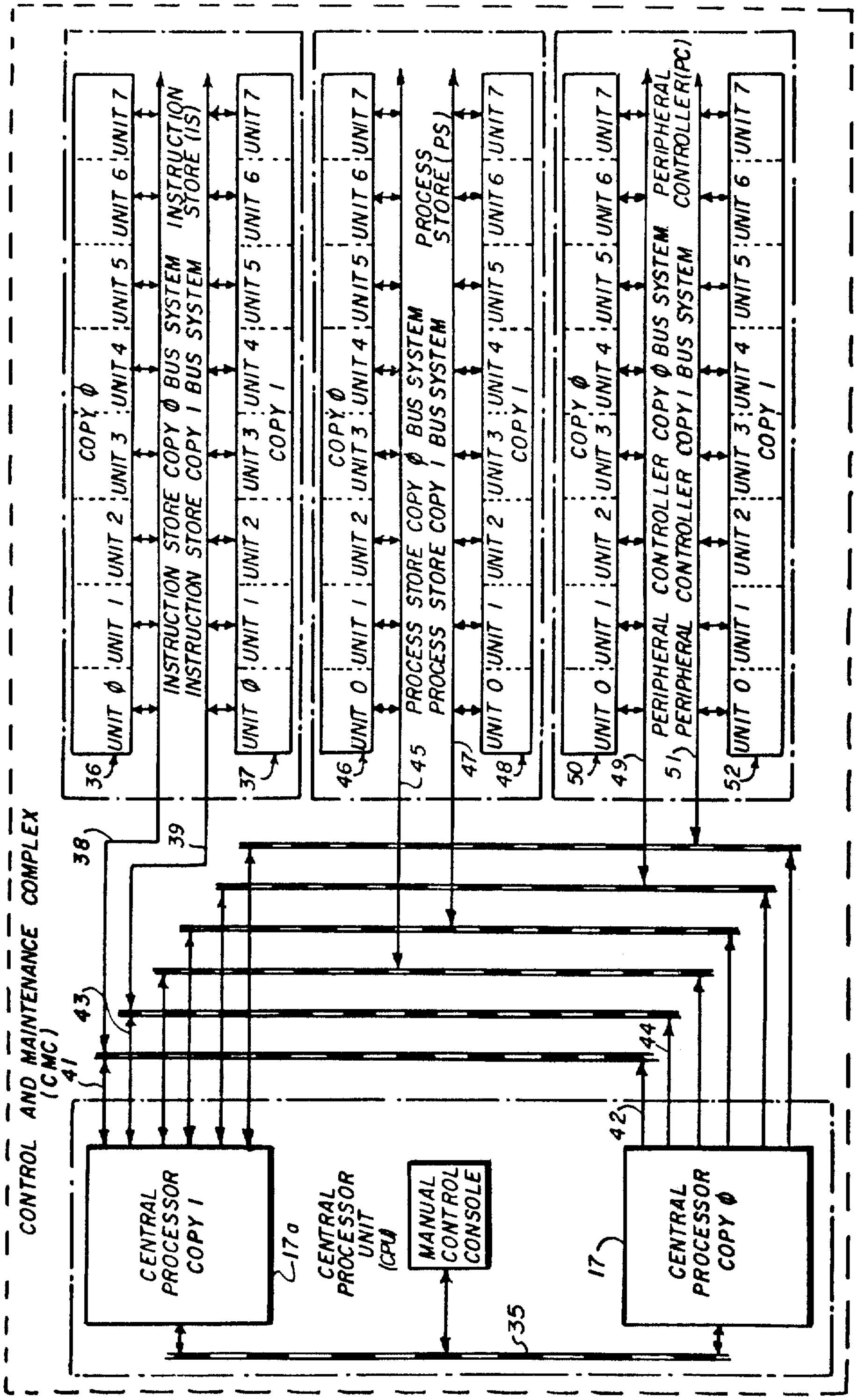
FIG. 2A is a functional block diagram showing communication between both copies of the Central Processor and duplicate copies of the Instruction Store, Process Store, and Peripheral Controller.

The functional interface between the Central Processor, and other system equipment, is shown in functional block diagram form in FIG. 2A. As can be seen, there is intercommunication between both copies of the Central Processor designated 17 and 17*a* respectively and the manual control console. Maintenance personnel can monitor the status and manually reconfigure the control and maintenance complex from this console.

As can also be seen in FIG. 2A, both Central Processor copies have direct, two-way communication links between each other, via internal bus 35, and with both copies of Instruction Store, designated 36 and 37 respectively, via their associated bus systems 38 and 39. Similar communication is provided with the Process Store, and the Peripheral Controllers. This interface is provided by six separate bus systems.

I. An Instruction Store copy $\phi$ bus system (IS$\phi$.BS) is designated 38. This interfaces both copies 17*a*, 17 of the Central Processor via buses 41, 42 with each of the 8 units (IS$\phi$.U$\phi$ through IS$\phi$.U7) that form Instruction Store copy $\phi$ (IS$\phi$) generally designated 36.

II. An Instruction Store copy 1 bus system (IS1.BS) is designated 39. This interfaces both copies of the Central Processor via buses 43, 44 with each of the 8 units (IS1.U$\phi$ through IS1.U7) that form Instruction Store copy 1 (IS1), generally designated 37.

III. A Process Store copy $\phi$ bus system (PS$\phi$.BS) is designated 45; and it interfaces both copies of the Central Processor with each of the 8 units (PS$\phi$.U$\phi$ through PS$\phi$.U7) that make up Process Store copy $\phi$ (PS$\phi$), generally designated 46.

IV. A Process Store copy 1 bus system (PS1.BS) is designated 47; and it interfaces both copies of the Central Processor with each of the 8 units (PS1.U$\phi$ through PS1.U7) that make up Process Store copy 1 (PS1), generally designated 48.

V. A Peripheral controller copy $\phi$ bus system (PC$\phi$.BS) is designated 49; and it interfaces both copies of the Central Processor with each of the 8 Peripheral Controllers (PC$\phi$.U$\phi$ through PC$\phi$.U7) in Peripheral Control copy $\phi$ (PC$\phi$), generally designated 50.

VI. A Peripheral Controller copy 1 bus system (PC1.BS) is designated 51; and it interfaces both copies of the Central Processor with each of the 8 Peripheral Controllers (PC1.U$\phi$ through PC1.U7) in Peripheral Control copy 1 (PC1), generally designated 52.

Each copy of the Peripheral Control bus system contains an address bus (PC$\phi$.AB and PC1.AB), a return bus (PC$\phi$.RB and PC1.RB), and a data bus (PC$\phi$.DB and PC1.DB). Each copy of the process store bus system contains an address bus (PS$\phi$.AB and PS1.AB) and a return bus (PS$\phi$.RB and PS1.RB). Each copy of the Instruction Store bus system contains an address bus (IS$\phi$.AB and IS1.AB, and a return bus (IS$\phi$. RB and IS1.RB). Each copy $\phi$ of the Instruction Store bus system and the Process Store bus system share the same data bus: Instruction Store and Process Store copy $\phi$ data bus (IP$\phi$.DB). Each copy 1 of the Instruction Store bus system and the Process Store bus system also share the same data bus: Instruction Store and Process Store copy 1 data bus (IPI.DB).

This data bus sharing by Instruction Store and Process Store affects the sequence of instructions that are to be executed by the Central Processor. An instruction directing the Central Processor to access (read from or write into) Process Store requires only one machine cycle, while an instruction directing the Central Processor to access Instruction Store requires two machine cycles. This means that the Central Processor can execute Process Store instructions in sequence, one after the other, for as long as needed, and it can also execute an Instruction Store instruction immediately following a Process Store instruction. However, it cannot execute two Instruction Store instructions, in sequence, nor can it execute a Process Store instruction immediately after an Instruction Store instruction, because of the shared data bus. The Central Processor will have been in the execution of an Instruction Store instruction only one machine cycle of the two required, when it starts executing the next instruction in sequence, and these two instructions cannot use the same data bus (IP$\phi$.DB) or IPI.DB) simultaneously.

It is believed that a better understanding of the present invention will be obtained if there is an understanding of the overall function of each circuit in the CP, realizing that there are duplicate copies of the CP.

II. A. Processing Circuits of Central Processor Timing Generator Circuit (TGC)

Figure 3:
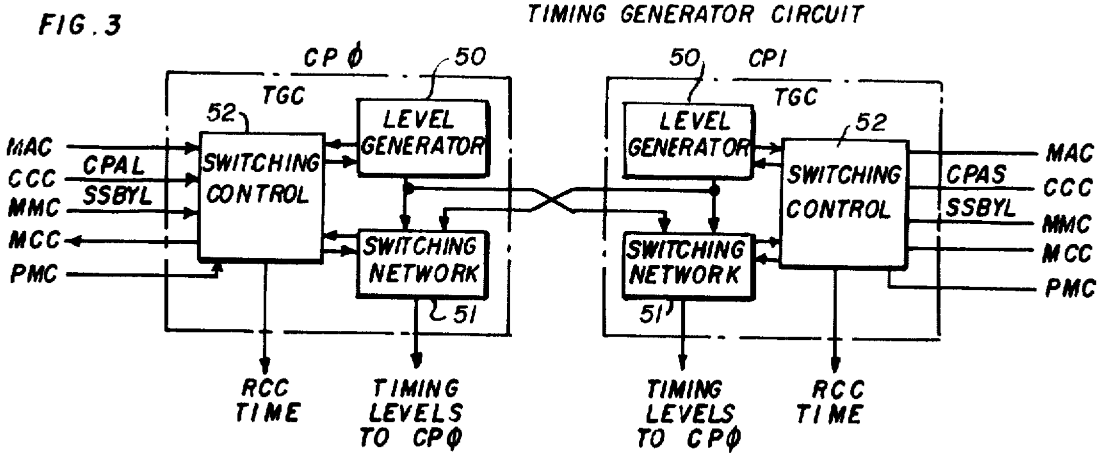
FIG. 3 is a functional block diagram of the Timing Generator Circuit of the Central Processor.

The Timing Generator Circuit 21 of FIGS. 1 and 2 (TGC) creates the timing intervals for the Central Processor. A more detailed functional block diagram for the TGCs of both Central Processors is shown in FIG. 3.

The TGC includes a level generator circuit 50 and creates eight timing intervals (or "levels" as they are referred to) every 4 $\mu$ seconds. Each pulse is picked off a delay line. For each timing interval, TGC produces a 500 nano second (ns) timing interval place level (PL) and a 400 ns. timing interval accept level (AL). Each sequence of 8 timing intervals is called a cycle. Nearly all sequential control in the CP is provided by the timing interval place and accept levels.

Generally, the timing interval place levels are used to gate information out of flip-flop storage while timing interval accept levels are used to accept information into flip-flop storage.

The TGC in each CP generate timing levels. To assure synchronism between CP's, Timing levels generated in the active CP control both CP's. A switching network 51 actuated by a switching control circuit 52 in each TGC transmits (if it is in the active CP) or receives the timing levels from the active TGC, and supplies them to the CP circuits. The standby CP may be stopped by directing the TGS in the standby CP to inhibit reception of timing levels. The TGS also notifies the Recovery Control Circuit 29 (RCC) and Timing Monitor Circuit 27 (TMC) for maintenance purposes whenever the CP's active/standby status changes.

PROCESSOR CONTROL CIRCUIT (PCC)

Figure 4:
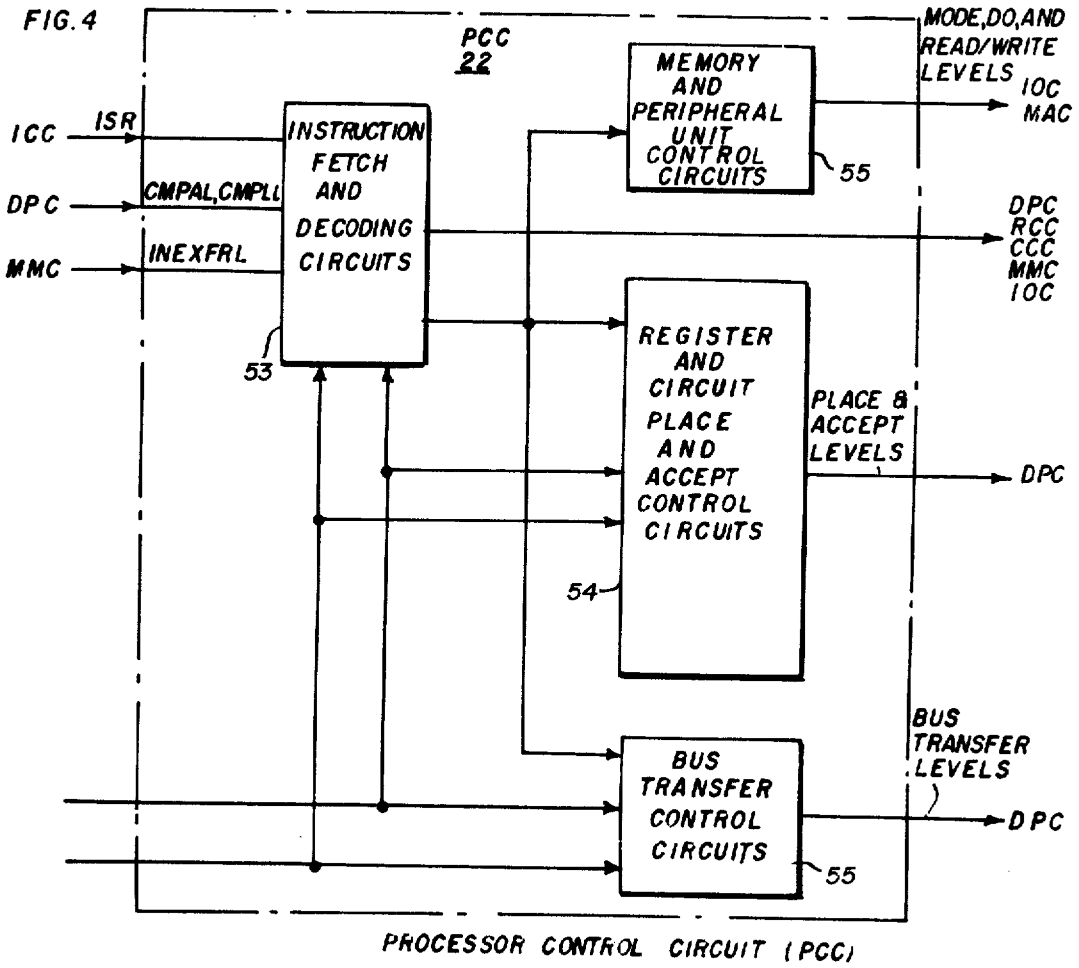
FIG. 4 is a functional block diagram of the Processor Control Circuit of the Central Processor.

The PCC 22 (see FIG. 4 for a more detailed functional block diagram) includes instruction fetch and decode circuits 53 which decode each instruction and generate the control signals required to execute the instruction and to read the next instruction from IS.

The instructions are performed in the DPC 23 by a sequence of data transfers—one in each of the eight timing intervals. Each data transfer is controlled by three simultaneous command from the PCC to the DPC:

1. A register place command (generated in block 54) which places a DPC register or circuit on the Interval Output Bus of the PCC.
2. A Bus Transfer Command (generated in bus transfer control circuits 55) which transfers the information on the Internal Output Bus to the Internal Input Bus, and
3. A Register Accept Command (also generated in block 54) which gates the information on the Internal Input Bus to a DPC register.

The PCC also provides auxiliary commands to the DPC such as the selection of the function to be provided by the Logic Comparator Circuit (LCC).

Memory and peripheral unit control circuits 55 of the PCC provide the control signals to the IOC including the mode bits to be transmitted to these complexes.

The instruction fetch logic of block 53 controls an Instruction Address Register IAR, Add One Register AOR, and the instruction store read for the next instruction. The next instruction is read from the Instruction Store simultaneously with the execution of its predecessor.

The PCC also decodes the HELP instruction which is an input to the RCC that initiates a system recovery program interrupt. The instructions RMSG, WMSG, and WMCP are decoded by the PCC but are executed by the Maintenance Access Circuit 30 (MAC). The Malfunction Monitor Circuit 26 (MMC) requires decoded instructions levels from the PCC in order to sample malfunction detection circuits.

DATA PROCESSING CIRCUIT (DPC)

The DPC 23 (see also FIG. 5) contains the registers of the CP and the circuits required to perform arithmetic, logical, decision, and data transfer operations on the information in these registers. The General Registers (GR1, . . . , GR7), in the Storage Section 56, the Special Purpose Register (SPR), also in Storage Section 56, and the Instruction Address Register (IAR) in the Address Section 57 are the program accessible registers. These registers and the operations which are performed on these registers by individual instructions are described more fully in the above-referenced application.

The remaining registers [Data Register (DR) and Arithmetic Register (AR) in Data Section 58, the Selection Register (SR), and Add One Register (AOR)] and circuits (Logic Comparator Circuit (LCC), Add Circuit (ADC) the Add One Circuit (AOC), and the Bus Transfer Circuit 59 (BTC) provide the data facilities required to implement the instruction operations on the program accessible registers.

A 32 bit Internal Input Bus (IIB) 60 is the information source for all DPC registers. In general, the DPC registers and circuits as well as other CP circuits place information on the 32 bit Internal Output Bus (IOB) 61. The Bus Transfer Circuit (BTC) 59 transmits information from the IOB 61 to the IIB 60. The information can be transferred in six ways which include complementing or not complementing the information, exchanging 16 bit halves (with or without complementing), or shifting the information left or right one bit.

A logic and compare circuit (LCC) provides a 32 bit logical AND, NOR, or EQUIVALENCE of the AR and DR and also matches the AR and DR. The ADD Circuit (ADC) provides the sum of the left half of the AR and the right half of the AR. The ADC is used for addition and subtraction and to generate PS and PU addresses. The 17 bit Instruction Address Register (IAR) is used to address the Instruction Store. The Add-One-Circuit (AOC) increments the right most 16 bits of the IAR by one. The AOC is used to compute the next instruction address (one plus the current address which will be used if a Program Transfer does not occur.

INPUT OUTPUT CIRCUIT (IOC)

Figure 6:
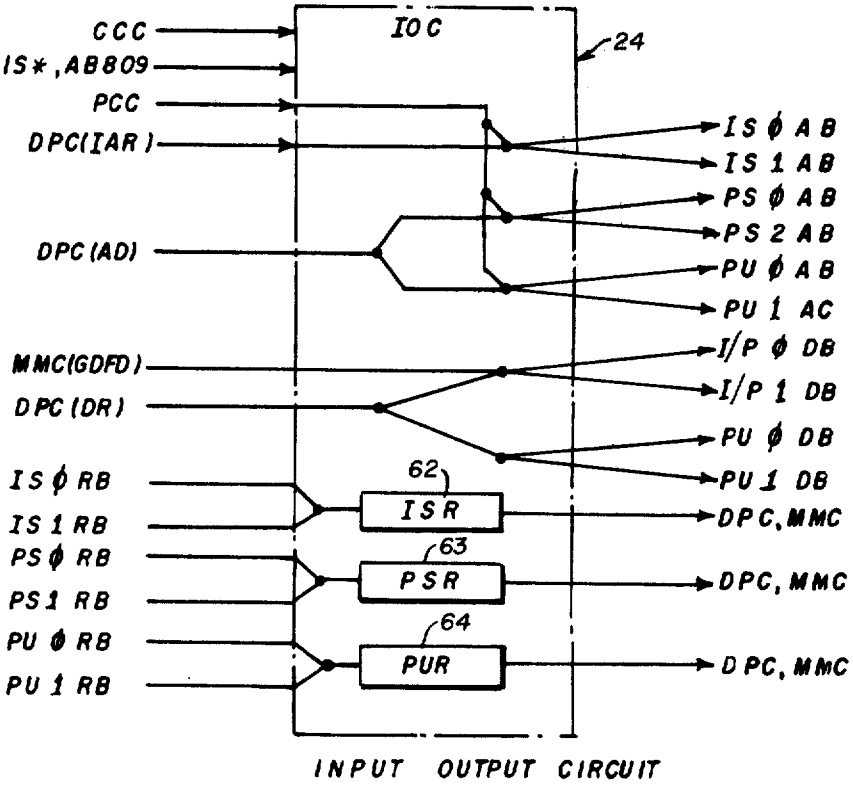
FIG. 6 is a functional block diagram of the Input/Output Circuit of the Central Processor.

The primary function of the IOC 24 (see also FIG. 6) is to provide the interface through which the Central Processor complex (CP*) gains access to the non-CP complexes (IS*, PS*, and PC*) via the external bus system. As seen diagrammatically in FIG. 6, the IOC sends data and addresses from the CP to the non-CP complexes and also receives and buffers data transmitted to the CP from the non-CP complexes. The external bus system, used to transmit information between CP* and the non-Cp complexes, comprises the Instruction Store Address Bus (IS*.AB), Process Store Address Bus (PS*.AB), Peripheral Control Address Bus (PC*.AB), Instruction Store-Process Store Data Bus (IP*.DB), Peripheral Control Data Bus (PC*DB), Instruction Store Return Bus (IS*.RB), Process Store Return Bus (PS*.RB), and Peripheral Control Return Bus (PC*.RB).

Each bus consists of two copies which are associated with corresponding copies of IS*, PS*, and PC*. At the processing level, the IOC may be considered to use both copies of the bus without distinction between the copies. To provide the reconfiguration capability (maintenance level), the IOC transmits on or receives from copy ϕ, copy 1, or both copies of a particular bus. The choice of bus copies is determined by the Configuration Control Circuit 25.

There are three buffer registers in the IOC: the Instruction Store Register (ISR) designated 62, the Process Store Register (PSR) 63, and the Peripheral Unit Register 64. These registers communicate with both copies of the Return Buses from IS, PS and PU respectively; and they send received data to the DPC 23 and MMC 26, as shown.

II. B MAINTENANCE CIRCUITS

The functions performed by the CP maintenance circuits include the following:

1. System configuration control (CCC 25),
2. Malfunction detection (MMC 26, TMC 27, DPC 23),
3. Recovery program initiation (ICC 28),
4. Recovery program monitoring (RCC 29, TMC 27),
5. Maintenance program access to CP circuits (MAC 30, MMC 26), and 6 Manual system control (MCC 20).

The CMC detects malfunctions as follows:

1. By matching, between CP copies, all data transfers in the CP Data Processing Circuit (MMC), 2 By parity checking of all memory read operations (MMC), 3. By monitoring internal checks by the IS*, PS*, and PC* (all-seems-well checks),
4. Address echo matching of addresses sent to IS*, PS*, and PC* with the echo address returned by the complex (DPC),
5. Timing level generation (TMC), and
6. Excess program time checking (DPC).

Figure 8:
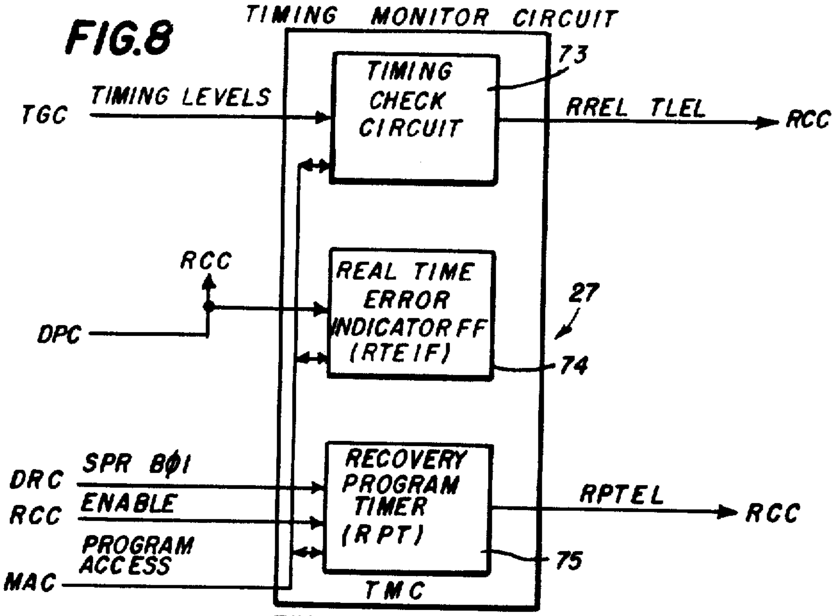
FIG. 8 is a functional block diagram of the Timing Monitor Circuit of the Central Processor.

When a malfunction is detected by MMC 26, the Interrupt Control Cicuit (ICC) 28 may initiate a maintenance interrupt to a recovery program. The recovery program attempts to locate the faulty unit, remove it from service, and reconfigure the complexes to a working system. The execution of the recovery programs are monitored by the TMC 27 and the RCC 29. The system recovery program is initiated (reinitiated) by the TMC 27 and the RCC 29 when higher level recovery is required. The Timing Monitor Circuit monitors recovery programs through the Recovery Program Timer (RPT) in the TMC 27 (see FIG. 8). If a recovery program fails to remain in synchronism with this timer, the TMC initiates (or re-initiates) the system recovery program through the Recovery Control Circuit. The execution of a HELP instruction may also initiate (re-initiate) the system recovery program directly through the RCC.

MALFUNCTION MONITOR CIRCUIT (MMC)

Figure 7:
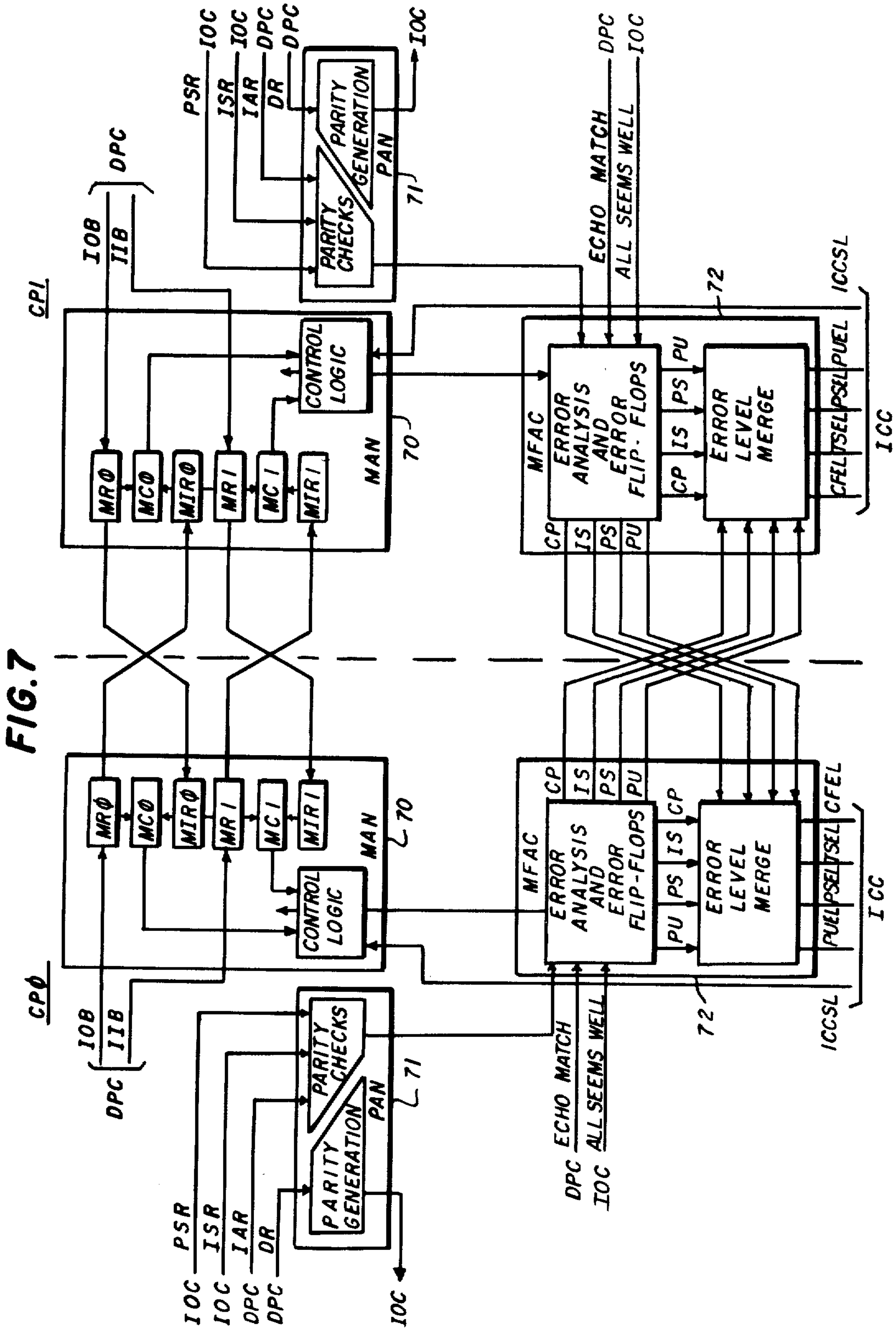
FIG. 7 is a functional block diagram of the Malfunction Monitor Circuit of the Central Processor.

The MMC 26 (seen in more detail in FIG. 7) provides the following maintenance functions:

1. Detection of malfunctions during the execution of programs,
2. Classification of malfunctions into CP*, IS*, PS*, and PC* caused malfunctions,
3. Indication of a CP, IS, PS, or PC malfunction occurrence to ICC in each CP,
4. Storage of malfunction indications on error flip-flops,
5. Storage of the address of the instruction being executed when a maintenance interrupt occurs,
6. Special facilities for use by recovery programs,
7. Access to standby CP for extraction of diagnostic data through the match facilities,
8. Facility to monitor standby CP executing off line maintenance programs (Parallel Mode), and
9. Facities for routining the MMC itself.

The Malfunction MOnitor Circuit 26, shown is divided into the following three sub-circuits:

1. MAtch Network (MAN), designated 70,
2. PArity Network (PAN), designated 71, and
3. Malfunction Analysis Circuit (MFAC), designated 72.

The MAtch Newtork (MAN) provides all inter-Central Processor matching facilities. In addition to malfunction detection, the match network can be used for extracting diagnostic data from the standby CP for routining the match network itself. The control logic within the MAN controls the match network according to match modes selected by the maintenance programs.

The PArity Network 71 (PAN) contains all the Parity Circuits used in checking the transmission and storage of information in the Instruction Store (IS*) and Process Store (PS*).

The Malfunction Analysis Circuit 72 monitors malfunction detection signals from 1. MAN (inter CP matching),
2. PAN (parity checks),
3. DPC (address echo match), and
4. IOC ( all-seems-well signals).

The malfunction detection signals are sampled according to the timing intervals and instructions being executed. When a malfunction is detected an error flip-flop associated with the detection circuit is set to be used by maintenance program to isolate the source of the malfunction.

The malfunction analysis circuit classifies the malfunction according to its most likely cause (CP*, IS*, PS*, or PC*) and a corresponding error level (CPEL, ISEL, PSEL, or PUEL) is sent to the Interrupt Control Circuit (ICC) in both CP's.

TIMING MONITOR CIRCUIT (TMC)

The TMC 27 (FIG. 8) provides three timing malfunction detection circuits:

1. Timing check circuit 73 which checks the timing levels generated by TGC,
2. A Real Time Timer Error FF (RTEIF) 74 which monitors the state of the overflow of the Real Time Timer RTT in DPC, and
3. A Recovery Program Timer (RPT) 75 which monitors recovery program execution.

Most failures of the active Timing Generator Circuit (TGC) do not cause inter-CP mismatches. These failures are detected by the TGC checking circuitry of the active TMC. The output of this Circuit is monitored by the active Recovery Control Circuit (RCC).

Failures of the standby TGC will cause inter-CP mismatches and are detected by the Malfunction Monitor Circuit. The standby RCC ignores error outputs of the standby TMC.

RTT, which is located in the DPC, has both an operational and a maintenance function. It provides real time synchronization for the operational programs and a sanity check on the execution. The RTT is a fourteen bit counter which is incremented by one every CP cycle (4 microseconds). The program may read or modify RTT through the Special Purpose Register (SPR). In this manner, RTT can provide time intervals of up to 65 milliseconds for the operational programs. The programs, however, must reinitialize RTT often enough to prevent the overflow from occurring. The active RCC monitors the RTT overflow. If the overflow occurs, RTEIF is set and the RCC initiates the system recovery operation.

RPT checks the execution of the Recovery programs. RPT is a seven bit counter which, when enabled, is incremented by one every CP cycle. RPT is enabled whenever a maintenance interrupt occurs and is disabled by the recovery program through MAC when recovery is completed.

The active RCC monitors the RPT of the active TMC and initiates further system recovery operations if the recovery programs fail to reset the RPT in the correct interval. The RPT has two checking modes. When first enabled by a maintenance interrupt, the recovery program must check into the RPT through the SPR exactly every 128th cycle. The recovery program may change the checking mode to permit check-in before the 128th cycle. In the second mode, checkins may not be more than 128 CP cycles apart. The recovery program changes the checking mode or disables the RPT through MAC and must do it at exactly the 128th cycle.

INTERRUPT CONTROL CIRCUIT (ICC)

Figure 9:
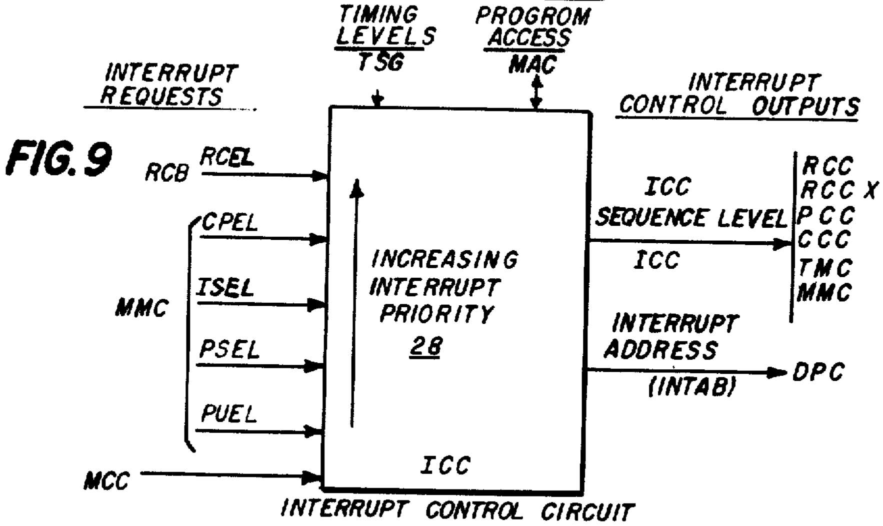
FIG. 9 is a functional block diagram of the Interrupt Control Circuit of the Central Processor.

The ICC 28 (FIG. 9) controls the execution of maintenance interrrupts. A maintenance interrupt is a one-cycle wired transfer instruction which causes the CMC to begin execution of a recovery program. The malfunction detection circuits in the CP initiate maintenance interrupt whose execution takes precedence over the execution of any other CP instructions.

The ICC provides five maintenance interrupts:

1. System Recovery.
2. CP recovery,
3. IS recovery,
4. PS recovery, and
5. PU recovery.

When an interrupt occurs, the ICC products an ICC interrupt Sequence Level (ICCSL) which controls the execution of the interrupt in the other CP circuits. The recovery program address corresponding to the interrupt is also placed on the INTerrupt Address Bus (INTAB) to the Data Processing Circuit, from which it is sent to the IS.U$\phi$ as the address of the next instruction to be executed.

The Malfunction Monitor Circuit initiates the CP, IS, PS, and PU recovery interrupts. The Recovery Control Circuit or the Manual Control Console initiates the system recovery interrupt. An interrupt may be initiated by either circuit during the execution of an operational program when a malfunction occurs. During the execution of a recovery program additional interrrupts may occur as a part of the recovery process.

To handle simultaneous interrupts and interrupts during execution of a recovery program, the ICC produces maintenance interrupts according to a priority structure. The system recovery interupt has highest priority and cannot be inhibited. The CP, IS, PS, and PU interrupts follow respectively in descending order of priority. A CP, IS, PS, or PU interrupt can occur if the interrupt itself or a higher priority interrrupt has not already occurred. CP, IS, PS, and PU interrupts may be individually inhibited by the maintenance programs.

RECOVERY CONTROL CIRCUIT (RCC)

Figure 10:
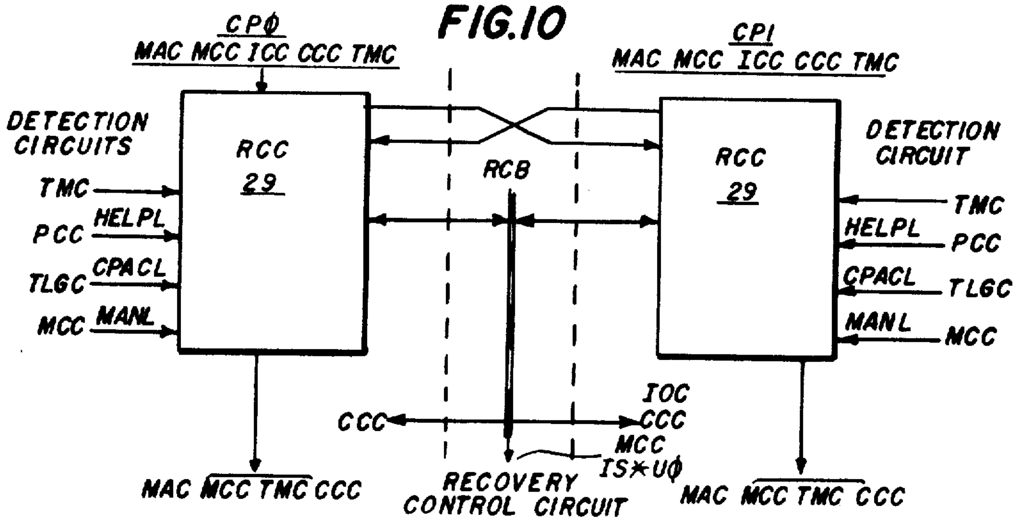
FIG. 10 is a functional block diagram of the Recovery Control Circuit of the Central Processor.

The RCC 29 (shown in duplicate copy in FIG. 10) monitors the malfunction detection circuits which cause system recovery program interrupts. The detection inputs to the RCC (RCC triggers) are produced by the timing generation check circuit in the TMC, error level from the DPC, the Recovery Program Timer in the TMC, a HELP instruction executed the PCC, CP active unit change detected by the TGC, and a manual request from the MCC.

Only the active RCC accepts triggers and initiates system recovery action. The RCC in the Standby CP is kept in synchronism with the active RCC but cannot affect the operation of the CMC.

When a trigger to the active RCC occurs, the RCC executes a wired logic reconfiguration program and then requests the ICC to execute a system recovery program interrupt. If the system recovery program cannot be completed (i.e., the configuration is not operable), another trigger occurs. Each consecutive feeds causes the RCC to force one of the four combinations of CP*, and IS*.U$\phi$ configurations CP$\phi$-IS$\phi$.U$\phi$, CP1-IS$\phi$.U$\phi$, CP1-ISI.U$\phi$, and CP$\phi$-ISI.U$\phi$). When an operating CP*-IS*.U$\phi$ configuration is selected, the system recovery program completes the recovery and reconfiguration process without further intervention by the RCC.

CONFIGURATION CONTROL CIRCUIT (CCC)

Figure 11:
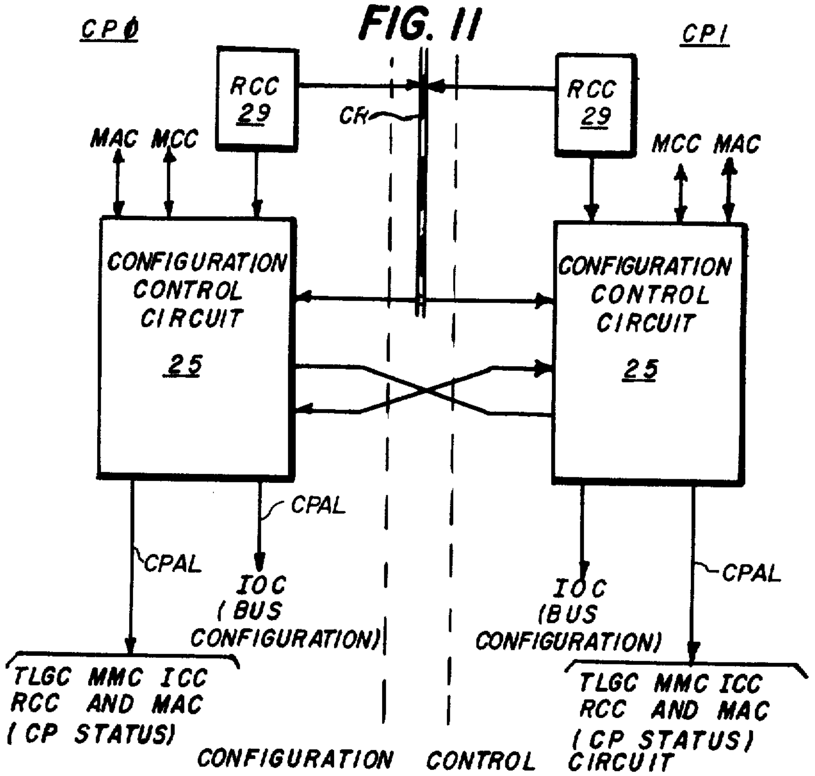
FIG. 11 is a functional block diagram of the Configuration Control Circuit of the Central Processor.

The CCC 25 (FIG. 11) defines the system configuration by controlling:

1. CP* status, and
2. The CP*-IS&, CP*-PS*, and CP*-PC* configurations.

The CP status is specified by:

1. The active CP indication,
2. The standby CP trouble status, and
3. The CP-CP error signal status (separated CPs or coupled CPs).

Each of the IS*, PS*, and PU*, has a bus system (address bus, data bus—the PS and IS share a data bus, and return bus). Each copy within IS*, PS* and PU* is permanently associated with an individual bus copy. The CCC defines the CP*-IS*, CP*-PS*, and CP*-PC* configurations by specifying the bus copy on which each CP copy sends and receives.

The CCC first defines a primary bus copy for each of the IS, PS, and PC bus systems. The active CP always sends and receives on the primary bus. The standby CP sends and receives according to the specific bus configuration. For each primary bus copy selection, four bus configurations can be defined:

1. DUPLEX specifying that the standby CP sends on and receives from the non-primary bus copy,
2. SIMPLEX specifying that the standby CP receives from the primary bus copy while the non-primary bus copy is not used,
3. MERGED specifying that the active CP sends on both bus copies and both the standby and active CP's receive from both bus copies (i.e., the return buses are merged), and
4. SIMPLEX-UPDATE specifying that the active CP sends on both bus copies to update the secondary memory copies but the standby CP receives from the primary bus copy only.

The duplex bus configuration is used when both CP's and all units on both buses are in-service. The simplex configuration is used when a unit on the secondary bus is out of service. The merged configuration is used when units on both the primary and secondary buses are out-of-service. The update configuration is used while updating an in-service unit on the secondary bus.

A diagnostic bus configuration is also available for IS* which is used in the diagnosis and recovery of IS*.

MAINTENANCE ACCESS CIRCUIT (MAC)

Figure 12:
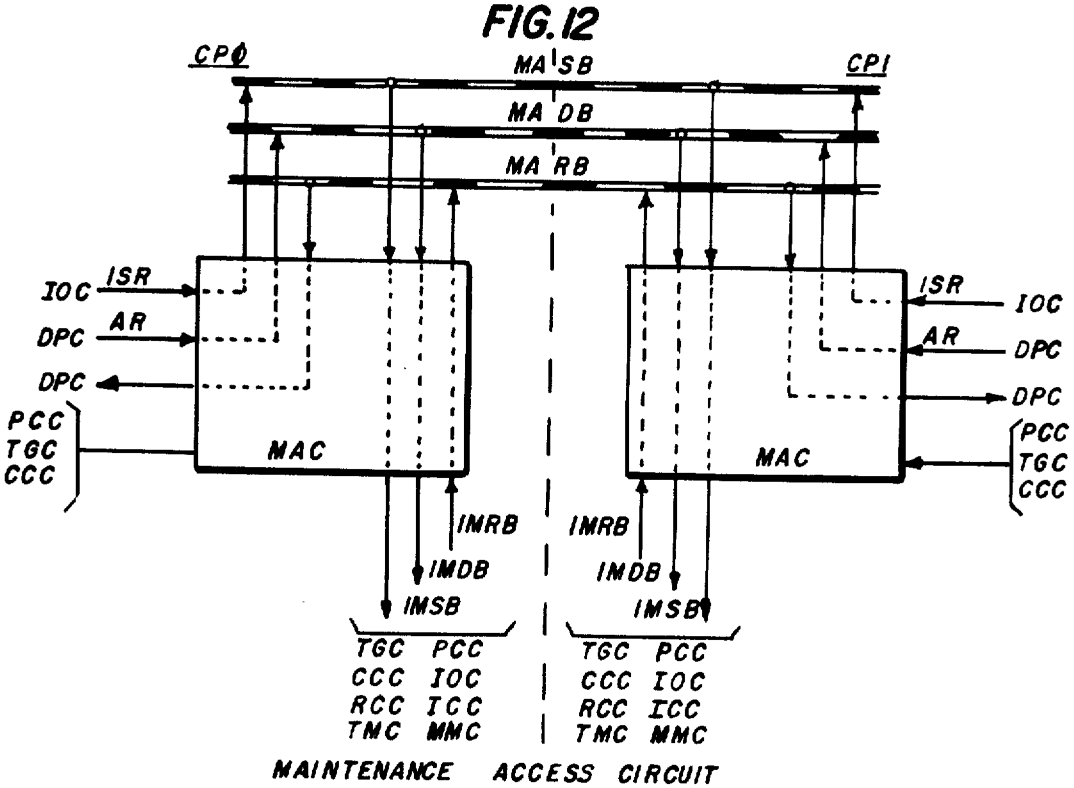
FIG. 12 is a functional block diagram of the Malfunction Monitor circuit of the Central Processor.

The MAC 30 (FIG. 12) provides maintenance program access to the CP circuits. Read Maintenance Sense Group (RMSG) is an instruction which allows a group of 32 sense points from either the active or the standby CP to be read into a general register (GR1-GR2 of the Data Processor Circuit 23, see FIG. 5). Write Maintenance Control Group (WMCG) and Write Maintenance Control Point (WMCP) are instructions which respectively allow the program to write a group of 32 maintenance control points or a single control point in either the active CP, the standby CP, or both CPs. In this context, "writing" means that each maintenance control point sets or resets one or more flip-flops.

Although the instructions are decoded and controlled by the PCC, as explained more fully in the above-identified Brenski, et al. application Ser. No. 289,718, MAC selects the control groups, transmits write data from the DPC to the maintenance control groups selected, and reads maintenance sense groups returning data to the DPC.

Maintenance sense and control groups in either the active or standby CP are always selected by the MAC in the active CP only. Write data for maintenance control groups is also always taken only from the MAC in the active CP. In other words, only the MAC in the active CP can execute MAC instructions.

POWER MONITOR CIRCUIT (PMC)

A Power Monitor and Control Circuit (PMC) (not shown) controls the actions necessary to turn power on or off from a CP or controls the actions necessary to remove power from a CP in which there is a defective power supply.

In case of trouble in a power supply of a CP copy, the PMC will remove all remaining power supplies from that copy.

When power is turned back onto the CP, the PMC will guarantee that the power can be turned on only to the standby CP while keeping the other CP active.

III. TIMING MONITOR CIRCUIT

The Timing Monitor Circuit 27 (TMC) performs three principal functions as follows:

a. The TMC monitors the performance of CP's Timinig Generator Circuit 21 (TGC). This is accomplished by the Timing Check Circuit 73 of FIG. 8 which, in turn, comprises a Repetition Rate Check circuit 76 (RRCC) and a Timing Level Check Circuit 77 (TLCC), both of which are shown in the functional block diagram of the TMC in FIG. 13.

b. The TMC alco monitors the execution of all recovery programs by CP in the Recovery Program Timer 75 (RPT).

c. The TMC also monitors the execution of all programs by CP. This is accomplished by the Real Time Error Indicator Flip-Flop 74 which monitors the overflow bit of the Real Time Timer of the Special Purpose Register (SPR) located in the Storage Section 56 of the Data Processor Circuit 23, see FIG. 5. Additional information is given below.

Figure 5:
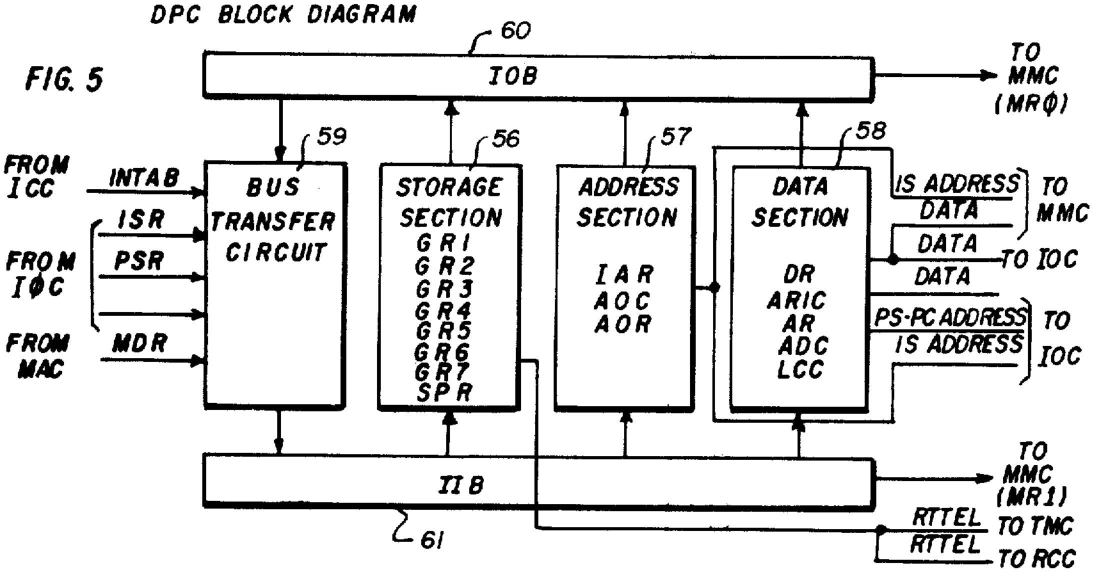
FIG. 5 is a functional block diagram of the Data Processing Circuit of the Central Processor.

When a malfunction is detected, an error signal is fed to Recovery Control Circuit 29 (RCC), see FIG. 5, requesting the initiation of a System Recovery Program (SRP).

Figure 13:
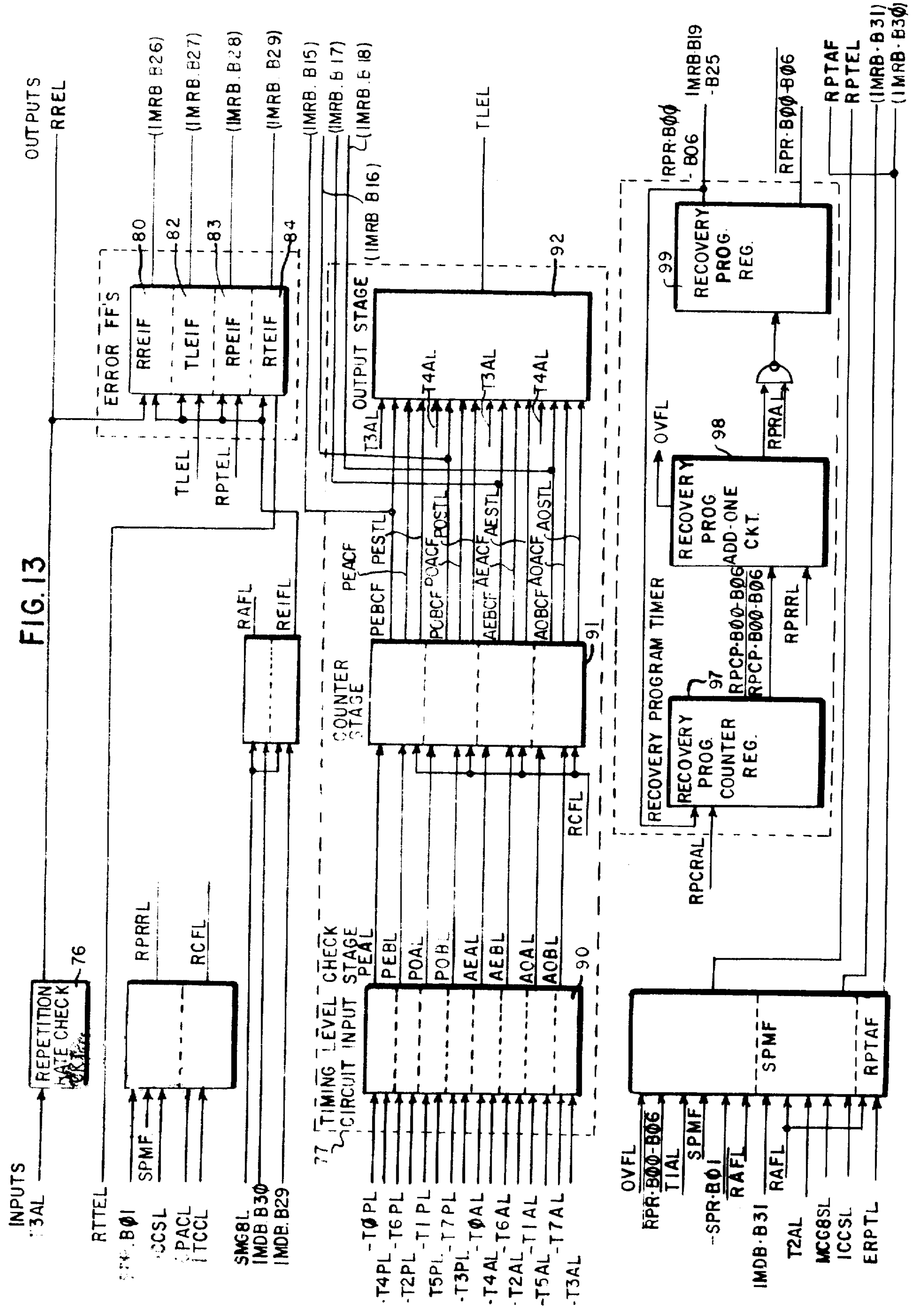
FIG. 13 is a functional block diagram of the Timing Monitor Circuit.
Figure 14:
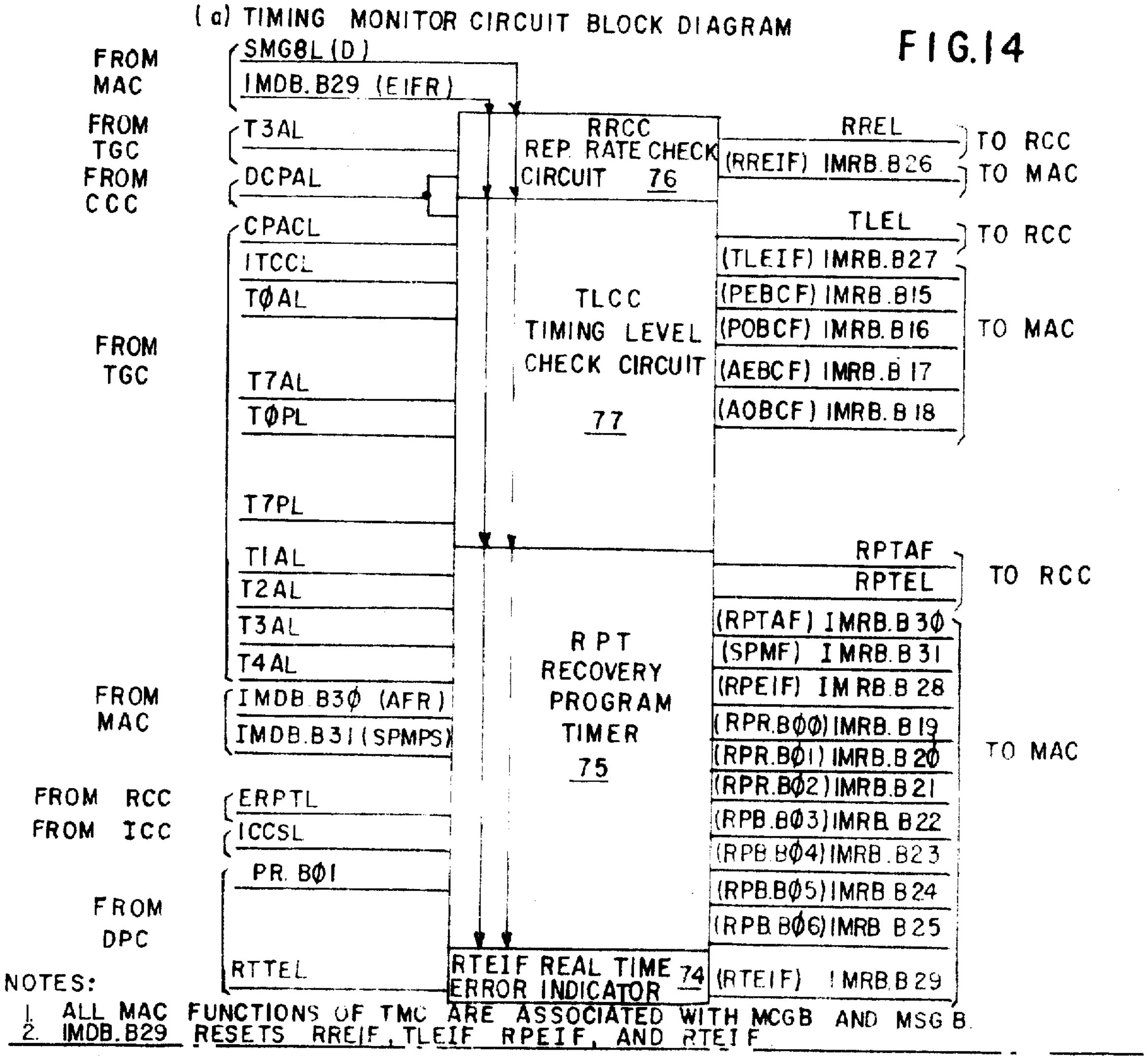
FIG. 14 is a functional block diagram of the Timing Monitor Circuit showing all inputs and outputs.

Still referring to FIG. 13, the following circuits perform all the required functions:

a. Repetition Rate Check Circuit (RRCC)

The RRCC 76 monitors the repetition rate of TGC 21 of the active CP.

b. Timing Level Check Circuit (TLCC)

The TLCC 77 monitors each Timing Place Level and each Timing Accept Level of TGC.

c. Recovery Program Timer (RPT)

The RPT 75 monitors CP's execution of all recovery programs. Each recovery program must PUNCH-IN at designated intervals to establish that the program itself is not at fault and that it is being properly executed.

d. Real-Time Error Indicator Flip-Flop (RTEIF)

The RTEIF 74 monitors the output of the Real-Time Timer located in Data Processor Circuit (DPC) 23, see FIGS. 1 and 5. The DPC is disclosed in more detail in the copending, co-owned application of Brenski, et al., for CONTROL COMPLEX FOR TSPS TELEPHONE SYSTEM, filed Sept. 15, 1972, Ser. No. 289,718. The disclosure of application Ser. No. 289,718 is incorporated herein by reference; however, a brief summary of the portion relevant here is given for convenience.

The SPR (FIGS. 140–142 of application Ser. No. 289,718) consists of one D-type Flip-flop (Bφφ), 15 D-SR type Flip-flops (Bφ1–B15) for SPR.L (i.e., the left half 16 bits of SPR) and 16 D-type Flip-flops for SPR.R. The output of SPR can be placed onto 10B except SPR.Bφ1. The functions of SPR.L are:

a. SPR.Bφφ is used as an indicator of carry (C.B16) of the Add Circuit in Data Section 58 of FIG. 5 hereof.

b. SPR.Bφ1 is used to control a PUNCH operation, described below, of the Recovery program Timer 75 of the Timing Monitor Circuit.

c. SPR.Bφ2-B15 comprise a counter circuit which serves as an indicator for real time consumption by program. This indicator reguires RAOC (reference numeral 620 in FIG. 140A of application Ser. No. 289,718) and RAOR (621 thereof) to increment the hardware counter (SPR. Bφ2–B15) every machine cycle. A more detailed description follows.

CARRY INDICATOR (SPR.Bφφ)

The carry indicator, SPR.Bφφ, consists of one D-type Flip-flop which accepts carry from ADC.B16 circuit during T7AL at all times. The output of SPR.Bφφ can be placed onto IOB.

PUNCH CONTROL OF RPT (RECOVERY PROGRAM TIMER) (SPR.Bφ1)

The PUNCH control consists of one D-SR type Flip-flop which accepts from IIB.Bφ1 under program control. This Flip-flop is always reset during T3AL. The output of this Flip-flop is fed to control the PUNCH operation of RPT 75 in Timing Monitor Circuit. (Recovery programs punch in at specific times by setting this bit to 1.)

INDICATION FOR REAL TIME CONSUMPTION BY PROGRAMS (SPR.Bφ2–B15)

The Real Time Indicator comprises 14 D-SR type Flip-flops (SPR.Bφ2-B15), the 14-bit Real Time Add-One Circuit (RAOC) and the 14-bit Real Time Add-One Register (RAOR) of the DPC to increment the Indicator (SPR.Bφ2-B15) every machine cycle.

The Real Time Indicator (SPR.Bφ2–B15) accepts data both from IIB.Bφ2–B15) under program control or from the RAOR output during T3AL. The output of the Indicator feeds both IOB and RAOC.

The RAOC consists of a 14-bit ripple carry chain Add-One circuit, similar to the one already described. It accepts and increments the Indicator output. The RAOC output RAOC.BφRAOR. The Real Time Timer Error Level RTTEL (Carry from RAOC.Bφ2) is an error level signal level which feeds both the Real Time Error Indicator Flip-flop 74 (RTEIF) in TMC 27 and the Recovery Control Circuit (RCC) 29 to call for a System Recovery program. The Recovery Control Circuit is described in more detail in the copending, coowed applications of Wilbur, et al., entitled RECOVERY CONTROL CIRCUIT FOR CENTRAL PROCESSOR OF DIGITAL COMMUNICATION SYSTEM, filed Mar. 15, 1973, Ser. No. 341,427, and the application of Wilbur, et al., entitled SYSTEM FOR RECONFIGURING CENTRAL PROCESSOR AND INSTRUCTION STORAGE COMBINATIONS, filed Mar. 15, 1973, Ser. No. 341,428. The disclosure of these two applications is also incorporated herein by reference.

REPETITION-RATE CHECK CIRCUIT (RRCC)

The RRCC 76 comprises an analog circuit (see FIG. 17) and a Repetition-Rate Error Indicating Flip-flop 80 (RREIF). The analog circuit monitors T3AL to insure the repetition rate of TGC lies within a satisfactory range. This circuit has a time constant of 5.5 usec. ± 1 usec. As illustrated in FIG. 16, if T3AL does not repeat within the specified range of the time constant, the analog circuit will produce at its output a level indicating that an error has occurred. This level continues to remain at "true" state as long as the absence of T3AL is sustained. This level is gated out via NAND gate 81 of FIG. 15 when DCPAL = 1 (Diagnostic CP Activity Level) where DCPAL = CPAL *v* DF, discussed below, indicating that the CP is active or is being diagnosed. It is important to realize that the gating is under program control of the diagnostic flip-flop DF.

The resetting of all the error indicator flip-flops, RREIF 80, TLEIF 82, RPEIF 83, and RTEIF 84 of FIG. 13 is accomplised under program control by the level REIFL.

ANALOG TIMER CIRCUIT

Figure 17:
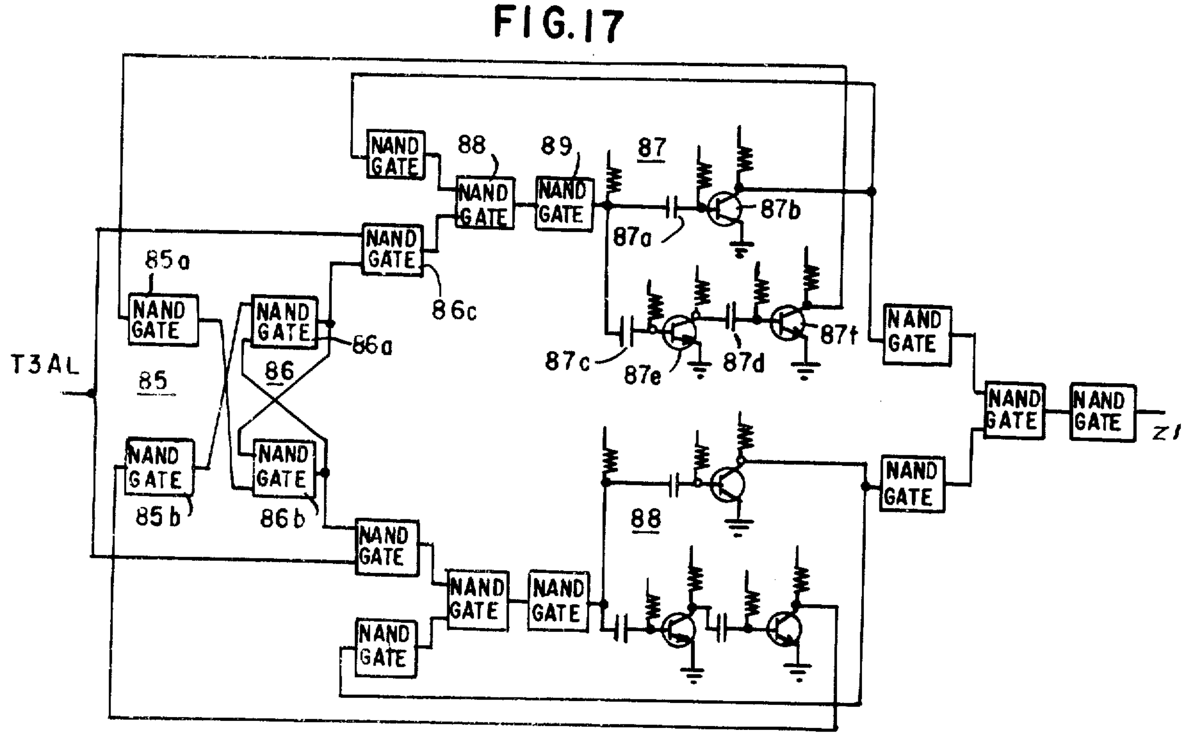
FIG. 17 is a circuit schematic diagram of the repetition rate check circuit.

Turning to FIG. 17, the input is T3AL, and the output is designated $Z_1$. Briefly, the circuit includes an input gating section 85 comprising NAND gates **85*a* and 85*b*, a switching bistable circuit 86 which includes NAND gates 86*a* and 86*b*, a first timing channel 87 and a second timing channel 88. The bistable circuit 86 alternately gates the input timing level being checked, T3AL to the timing channels 87, 88 which are similar, so that only one need be described in further detail for an understanding of the invention. The timing channel 87 includes a first monostable circuit including a capacitor 87*a* and a transistor 87*b*, and a second similar, cascaded monostable circuit including capacitors 87*c* and 87*d*, and transistors 87*e* and 87*f***.

The output Z1 is a 1 if there is no input. If the flip-flop 86 is in the "set" condition with gate 86c having a 1 input, transistor **87*b* will be driving to cut-off for the period of the monostable, thereby insuring that the output Z1 will remain at O—the non-alarm state. The output of the monostable also feeds back to latch the circuit by inhibiting the next timing level from passing through gate 88. A short time after the first monostable is triggered (caused by delay through the cascaded circuit), transistor 87*f* conducts to switch the state of flip-flop 86, thereby routing the next timing pulse to monostable 88. The circuit thus toggles back and forth, remaining in the O** state until an input timing pulse does not occur for the monostable period which is greater than the normal period between successive T3AL pulses. It will be observed that the circuit is responsive only to changes in signal levels, not to constant levels.

Figure 18:
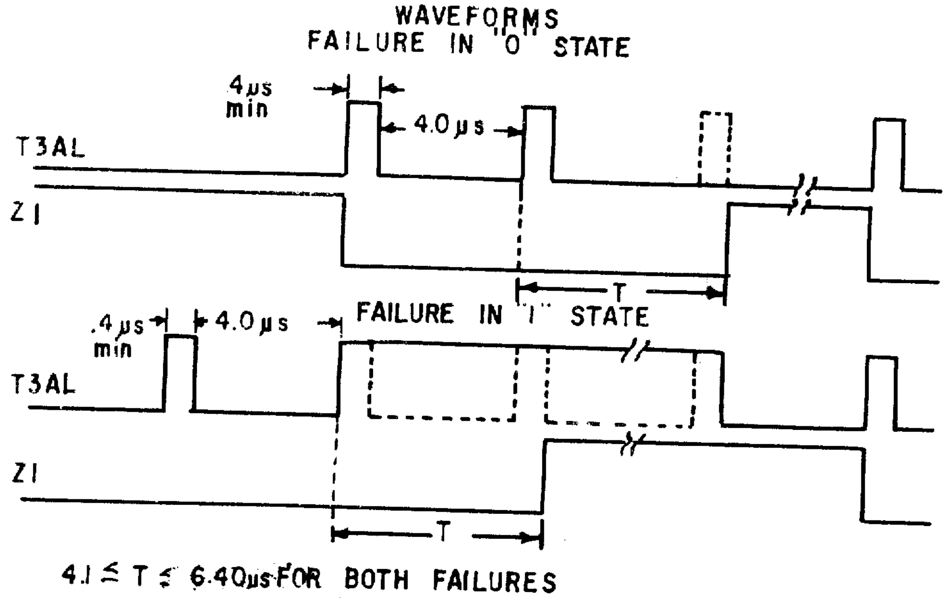
FIG. 18 shows idealized wave forms of timing levels indicating failure modes sensed by the repetition rate check circuit.

The repetition rate check circuit thus gives an alarm if the timing pulse that it is monitoring produces a timing level (i.e., pulse) signal at a rate greater than every 4 microseconds plus tolerances. If a clock pulse fails to appear within 4.50 to 6.50 microseconds after a previous pulse, both timing channels will have timed out, and a 1 appears at the output $Z_1$, indicating an alarm. The upper portion of FIG. 18 shows the relationship between input and output pulses when a failure appears in the O state—the absence of a timing level pulse being indicated by a dashed line. If the clock fails in the 1 state, the O to 1 transition is recognized as a valid pulse, causing the alarm to appear 4.50 to 6.50 microseconds later, as indicated in the lower portion of FIG. 18.

HARDWARE-SOFTWARE INTERFACE

The RREIF 80 can be interrogated by MAC 30, and it can be reset only under MAC control.

To Reset RREIF: Execute WMCP MCG8, EIFR

To Sense RREIF: Execute RMSG MSG8 X (GRX.B26)

EIFR is a common reset command for all error indicating Flip-Flops (RREIF, TLEIF, RPEIF, RTEIF) of TMC. The instructions are more fully explained in the above-identified copendiing application Ser. No. 289,711.

Figure 15:
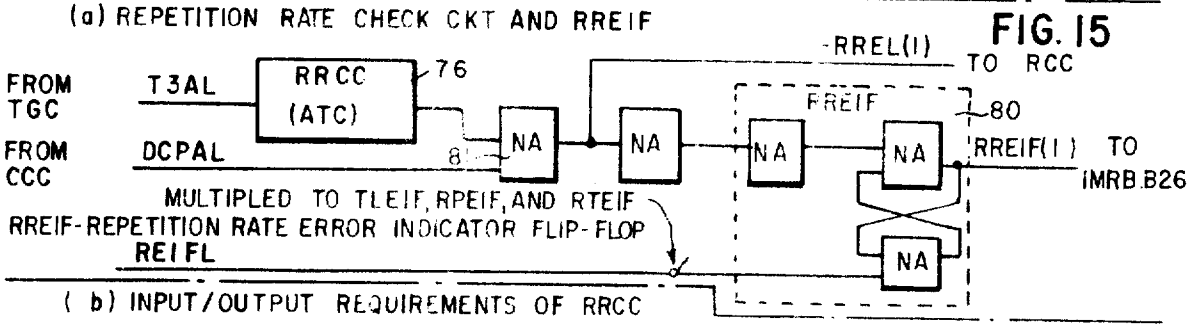
FIG. 15 is a functional block diagram of the repetition rate check circuit.
Figure 16:
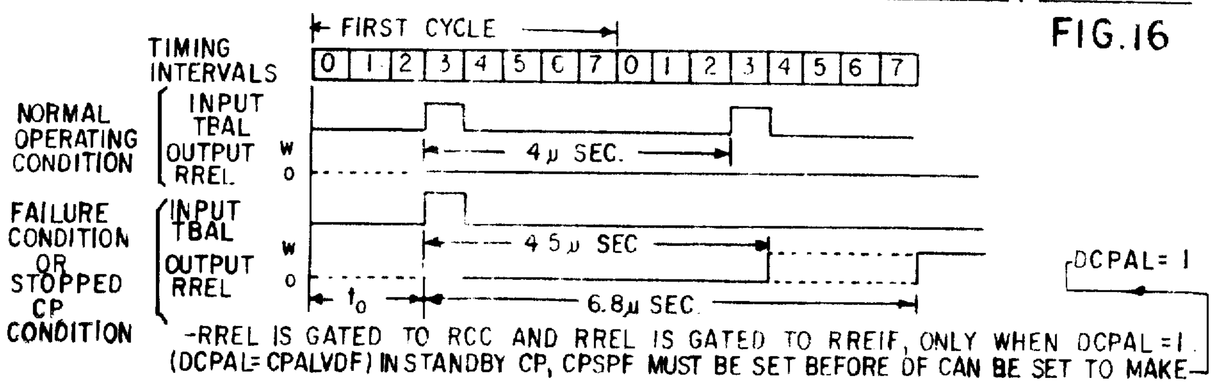
FIG. 16 is a timing diagram showing the inputs and outputs of the repetition rate check circuit.

The RREL (Repetition Rate Error Level) is the output of the analog circuit gated out by DCPAL via gate 81 of FIG. 15. The RREL feeds both RCC and RREIF 80. Since DCPAL = CPAL *v* DF and the RREL is gated out when DCPAL = 1, the analog circuit output is always gated out in the active CP where CPAL = 1, thus immediately signalling an error in timing level if it occurs in the active CP.

In the standby CP, however, the analog circuit output is not gated out in normal trouble free duplicate operation because DCPAL = 0. To routein RRCC, the CPSPF (CP Separate Flip-flop) should be set first before DF can be set under MAC control to make DCPAL = 1. With DCPAL = 1, the analog circuit output is gated out to RCC and RREIF, as illustrated in FIG. 15.

TIMING LEVEL CHECK CIRCUIT (TLCC)

The TLCC 27 comprises three major stages: input stage 90, counter stage 91 and output stage 92.

INPUT STAGE

Figure 19:
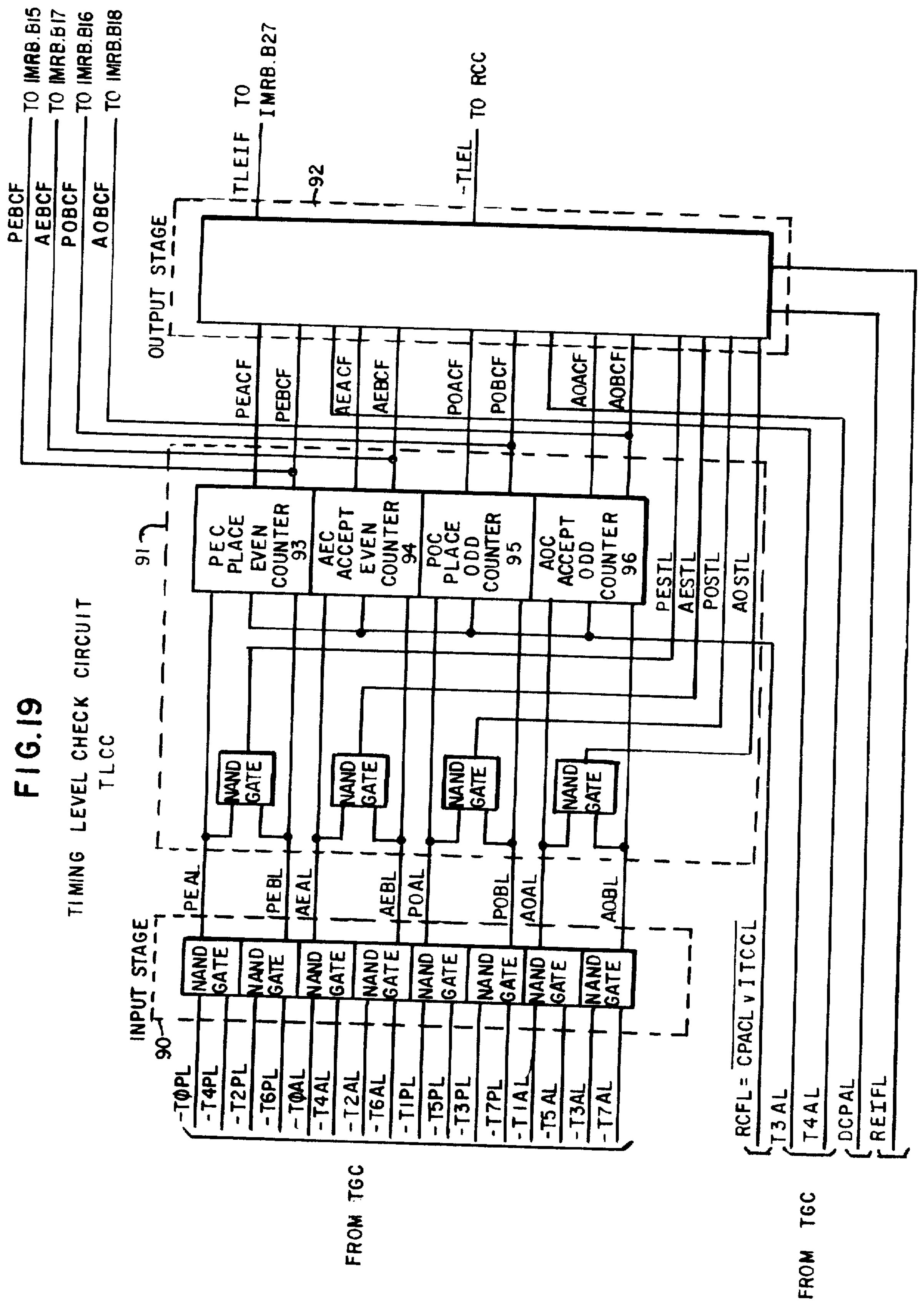
FIG. 19 is a functional block diagram of the Timing Level Check Circuit.

Referring particularly to FIG. 19, the input stage comprises eight NAND gates each of which receives two timing levels from TGC 21 (Timing Generator Circuit) and produces a signal. Each of the eight signals feeds one of four counter circuits 93, 94, 95, 96 comprising the counter stage 91 as follows:

| OUTPUT | ASSOCIATED COUNTERS |
|---|---|
| PEAL=TφPLvT4PL<br>PEBL=T2PLvT6PL | Place Even Counter (PEC) 93 |
| POAL=T1PLvT5PL<br>POBL=T3PLvT7PL | Place Odd Counter (POC) 95 |
| AEAL=TφALvT4AL<br>AEBL=T2ALvT6AL | Accept Even Counter (AEC) 94 |
| AOAL=T1ALvT5AL<br>AOBL=T3ALvT7AL | Accept Odd Counter (AOC) 96 |

The specific input and output signals to the Input Stage 90 are defined in FIG. 19.

COUNTER STAGE

Figure 20:
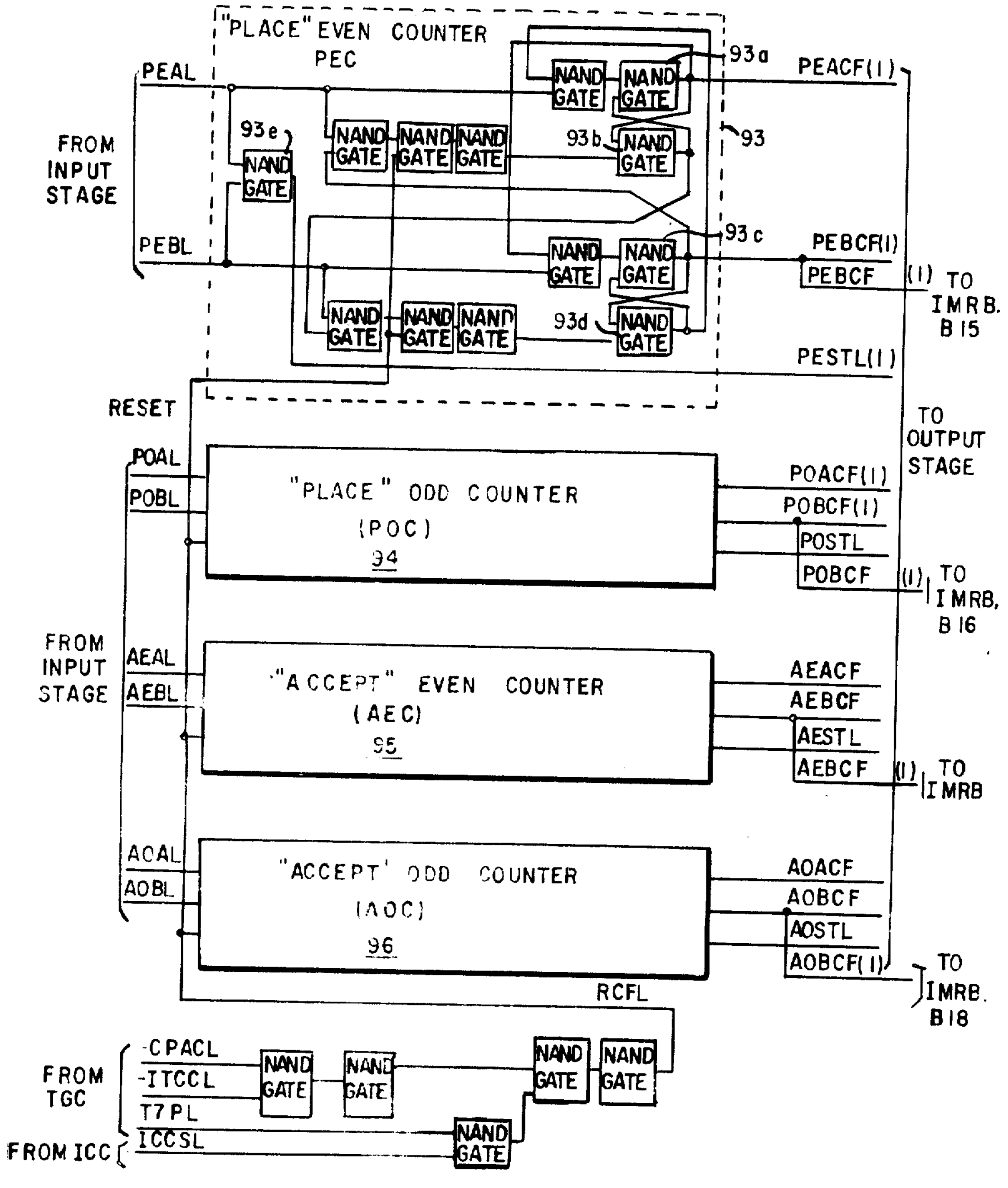
FIG. 20 is a logic circuit diagram of the Timing Level Check Circuit Counter Circuits.

The counter circuits 93–96 are each 2-bit counters similar to the one shown for the PEC 93 in FIG. 20. Each counter receives two of the eight trains of pulses generated in the input stage 90 from the incoming timing level pulses. Thus, the counter 93 has two flip-flops—one comprises NAND gates 93*a*, 93*b*; and the other comprises NAND gates 93*c* and 93*d*. The counters, the inputs to each counter, and the Flip-flops of each counter are listed as follows:

| INPUT | COUNTER FLIP-FLOPS | COUNTER |
|---|---|---|
| PEAL | PEACF | PEC-93 |
| PEBL | PEBCF | |
| POAL | POACF | POC-94 |
| POBL | POABF | |
| AEAL | AEACF | AEC-95 |
| AEBL | AEBCF | |
| AOAL | AOACF | AOC-96 |
| AOBL | AOBCF | |

To insure proper operation, all four counters are initialized (reset to zero) under one of the following conditions:

a. When the standby CP is about to become the active CP(CPACL = 1).

b. When the stopped standby CP is about to be restarted (ITCCL = 1).

c. When ICCSL – 1 during T7PL.

The reset signal consists of:

CPACL $v$ ITCCL or ICCSL·T7PL.

To reset, RESET NOT signal is required. It is designated $RCFL = \overline{CPACL \; v \; ITCCL \; v \; ICCSL \cdot T7PL}$.

The circuitry which generates RCFL from CPACL, T7PL and ITCCL (from TGC) and from T7PL and ICCSL (ICC) is shown at the bottom of FIG. 20. Reset occurs when RCFL goes from 1 to 0.

The function of these counters and associated circuitry just described is to check for the absence of timing levels when they were supposed to have occurred, as will be made clear presently.

Figure 23:
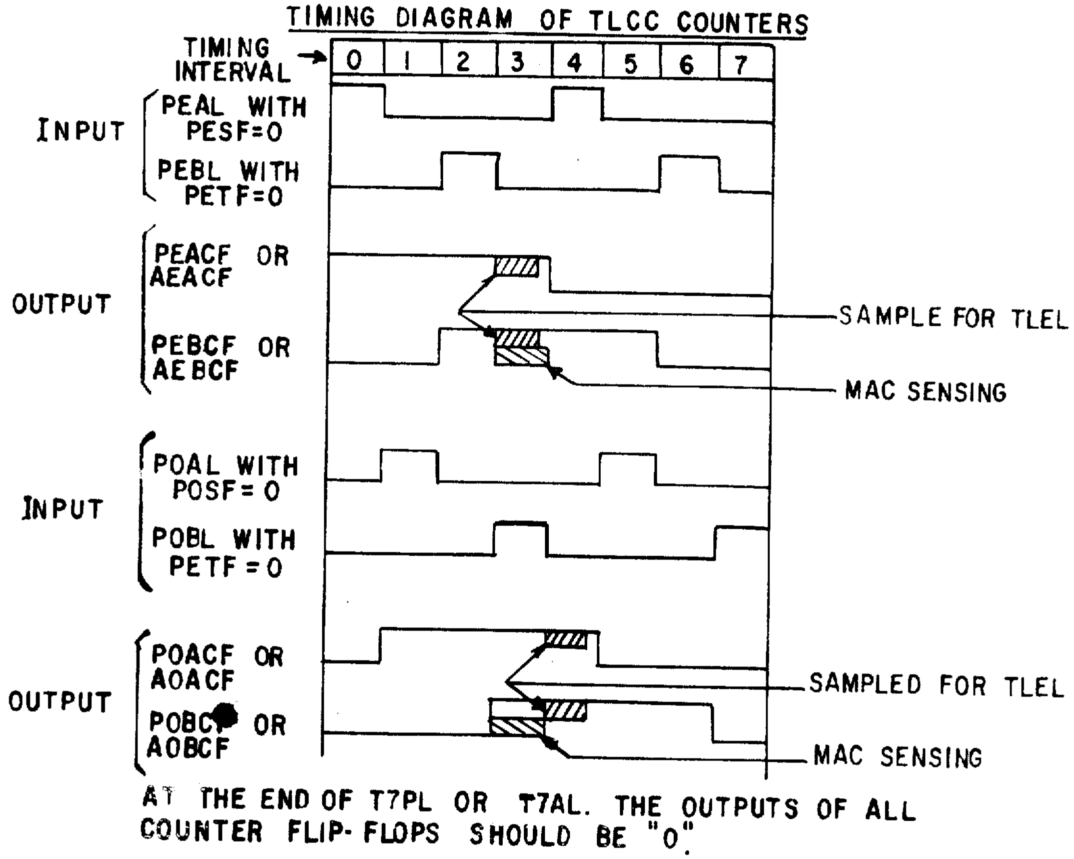
FIG. 23 is a timing diagram of the TLCC Counters.

Two inputs fed to each counter are also fed to a NAND gate associated with that counter. The NAND gate associated with counter 93 is designated 93*e* in FIG. 20. Each output of the four NAND gates are used to check improperly present timing levels. They are:

$PESTL = \overline{PEAL \cdot PEBL}$ $POSTL = \overline{POAL \cdot POBL}$ $AESTL = \overline{AEAL \cdot AEBL}$ $AOSTL = \overline{AOAL \cdot AOBL}$ Thus, the timing for the TLCC counters is shown in FIG. 23.

$PESTL = (\overline{T\phi PL \cdot T4PL}) \; v \; (\overline{T2PL \cdot T6PL}) = 1$ $POSTL = (\overline{T1PL \cdot T5PL}) \; v \; (\overline{T3PL \cdot T7PL}) = 1$ $AESTL = (\overline{T\phi AL \cdot T4AL}) \; v \; (\overline{T2AL \cdot T6AL}) = 1$ $AOSTL = (\overline{T1AL \cdot T5AL}) \; v \; (\overline{T3AL \cdot T7AL}) = 1$ The above levels must be considered to be functions of time since an error signal will be generated only as a function of time. If any of the levels goes to 0, a timing level is present when it should not have been.

The four levels (PESTL, POSTL, AESTL, and AOSTL) generated above are fed to the output stage. Also, the eight outputs from the counters are fed to the output stage for sensing by the Maintenance Access Circuit 30 as follows:

| COUNTER | COUNTER FLIP-FLOPS |
|---|---|
| PEC | PEACF<br>PEBCF |
| POC | POACF<br>POBCF |
| AEC | AEACF<br>AEBCF |
| AOC | AOACF<br>AOBCF |

OUTPUT STAGE

Figure 21:
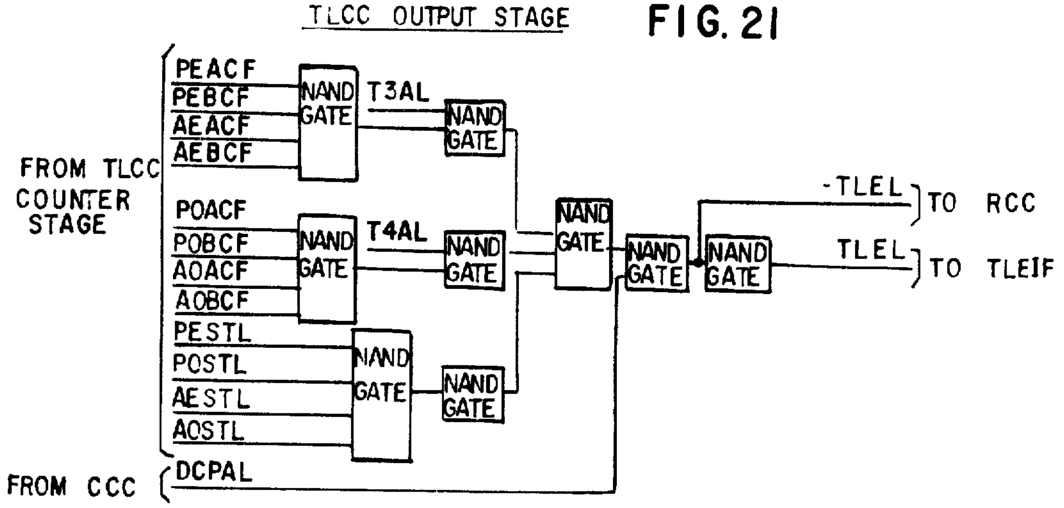
FIG. 21 is a logic circuit diagram of the Timing Level Check Circuit output stage.
Figure 22:
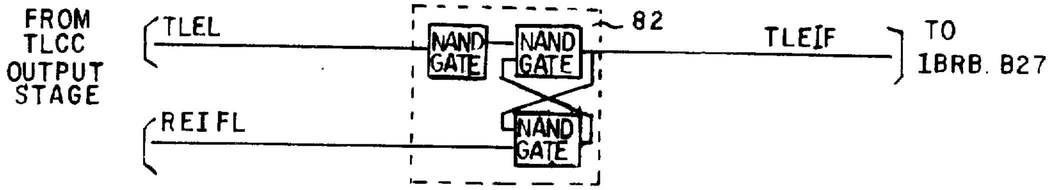
FIG. 22 is a logic circuit diagram of the Timing Level Error Indicating Flip-flop.

Referring now to FIG. 21, the TLCC output stage 92 comprises combinational logic as shown which samples the counter outputs just described, and the Timing Level Error Indicator Flip-flop 82 of FIG. 22 (TLEIF) which stores the error indication for sensing by MAC.

The outputs of the counters (PEC and AEC) which monitor "even" timing levels are sampled during T3AL. The outputs of the counters (POC and AOC) which monitor "odd" timing levels are sampled during T4AL. These eight outputs form the four counters together with the four NAND gate outputs (PESTL, POSTL, AESTL, and AOSTL) serve as input to Timing Level Error Level (TLEL) circuit. The logic expression of the Timing Level Error Level (TLEL) is as follows:

$TLEL = T3AL \cdot [(\overline{PEACF}) \cdot (\overline{PEBCF} \; v \; (\overline{AEACF}) \cdot (\overline{AEBCF})]$ $v \; T4AL \cdot [(\overline{POACF}) \cdot (\overline{POBCF}) \; v \; (\overline{AOACF}) \cdot \overline{AOBCF})]$ $v(\overline{PESTL}) \cdot (\overline{POSTL}) \cdot (\overline{AESTL}) \cdot (\overline{AOSTL})$ The TLEL feeds the RCC to request a system recovery program whenever an error is sensed. Also, the TLEL feeds TLEIF. The TLEIF can be reset only under MAC control.

To reset TLEIF:

The TLEIF can be reset under MAC control by executing the instruction:

WMCP MCG8 EIFR; (EIFR = MCG8·B29).

In summary, the Timing Level Check Circuit senses when a timing level or signal is not present when it should have been; and it also senses when a timing level is present and it should not have been.

RECOVERY PROGRAM TIMER (RPT)

Figure 24:
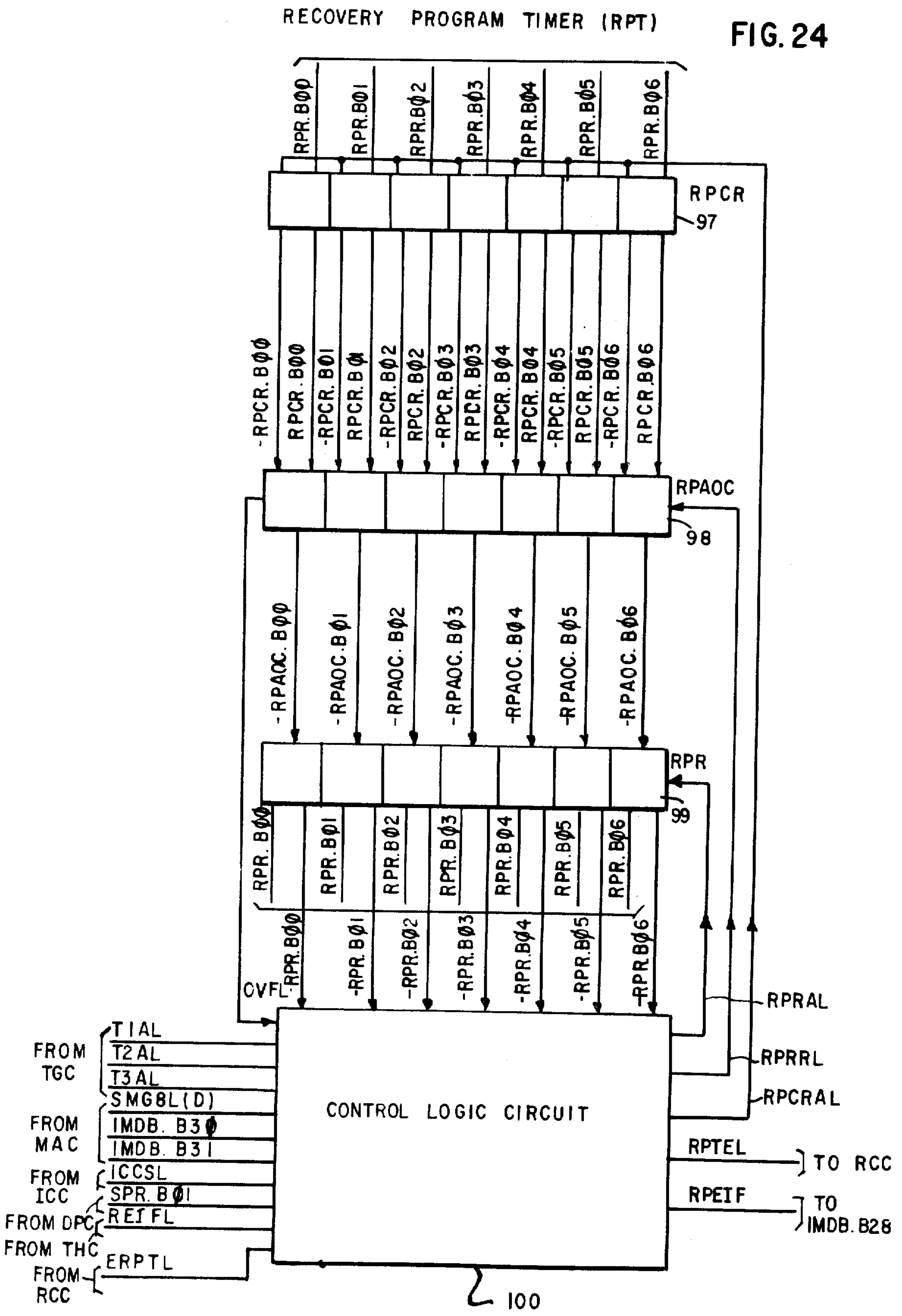
FIG. 24 is a functional block diagram of the Recovery Program Timer (RPT)
Figure 25:
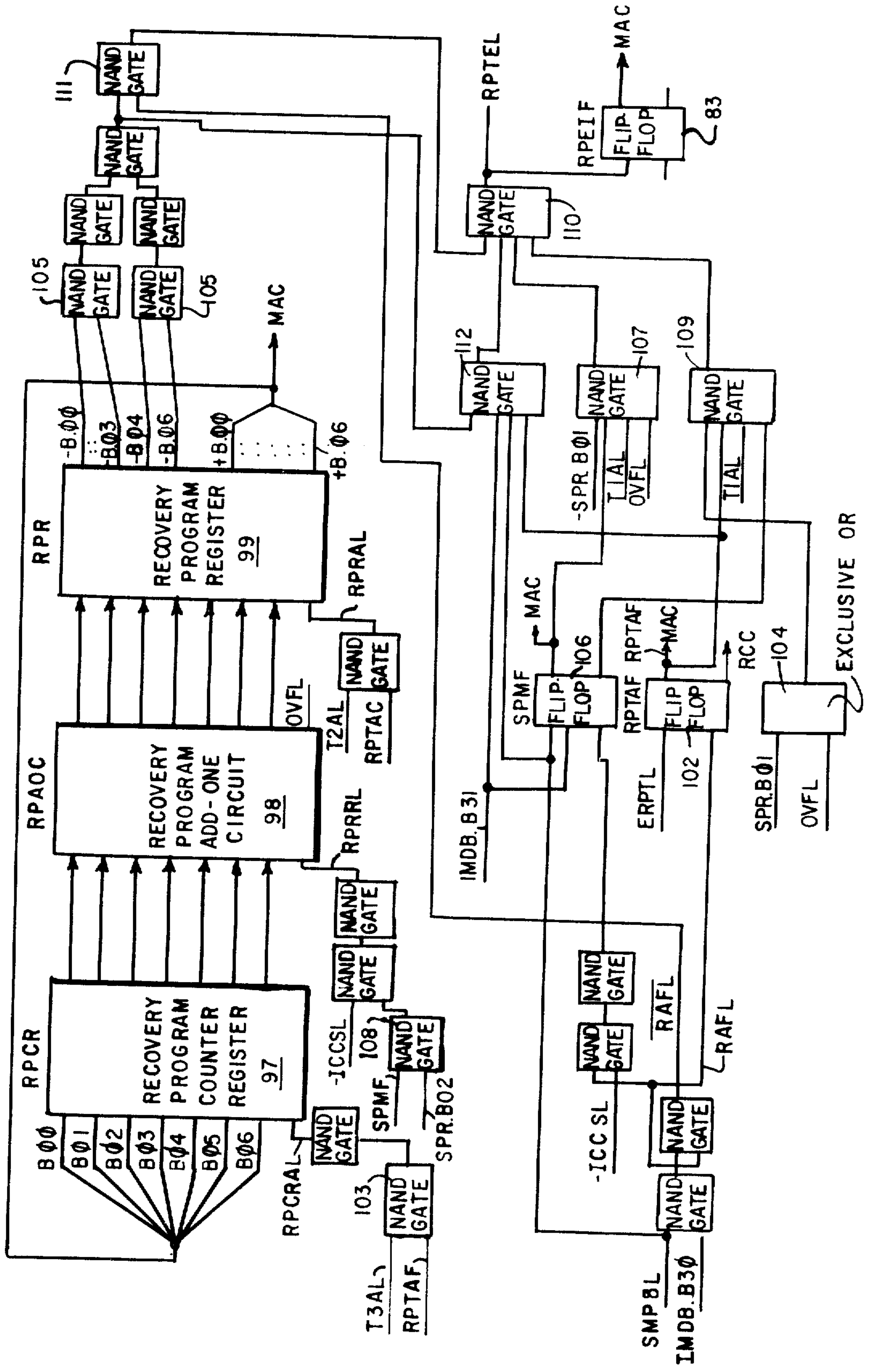
FIG. 25 is a circuit schematic diagram of the RPT.

Referring to FIGS. 13, 24 and 25, the RPT 75 comprises four principal circuits:

Recovery Program Counter Register 97 (RPCR),

Recovery Program Add-One Circuit 98 (RPAOC),

Recovery Program (Add-One) Register 99 (RPR), and

Control Logic Circuit 100 (CLC).

RECOVERY PROGRAM COUNTER REGISTER (RPCR)

Figure 27:
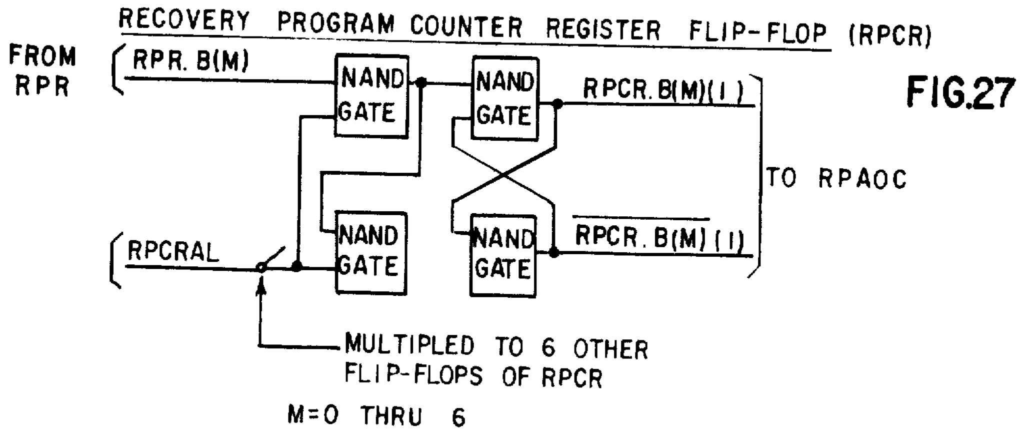
FIG. 27 is a logic circuit schematic of a Recovery Program Counter Register Flip-flop.
Figure 28:
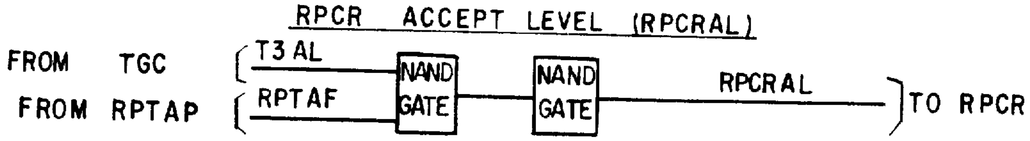
FIG. 28 is a logic circuit schematic of a Recovery Program Counter Accept Level Circuit.

The RPCR is a group of seven D-type Flip-flops. A single register stage is shown in FIG. 27, and the others are similar. The RPCR accepts 7-bit data from the output of RPR 99 during T3AL when RPT Activity Flip-flop (RPTAF), designated 102 in FIG. 25, is "true". The circuitry is shown in FIG. 28. It feeds RPAOC 98, as seen in FIG. 24.

Accept Level: $RPCRAL = RPTAF \cdot T3AL$ (see gate 103 — FIG. 25).

RECOVERY PROGRAM ADD-ONE CIRCUIT (RPAOC)

The RPAOC 98 comprises a 7-bit ripple carry chain add-one circuit. It is shown in circuit detail in FIG. 32. It increments the 7-bit data fed by RPCR 97 and feeds RPR 99. The carry ($C.B\phi\phi = OVFL$) from the highest order bit of RPAOC is fed to CLC 100 to generate the RPT Error Level; and it is fed to one input of an Exclusive OR logic circuit 104 of FIG. 25, the other input of which is Bit $\phi 1$ of the SPR. The logic expressions of RPAOC per stage are:

$m = 0 - 6$ $RPAOC.B(m) = C.B(m+1) \oplus RPCR.B(m)$ $C.B(m) = C.B(m+1) \cdot RPCR.B(m)$ $C.B(\phi 7) = 1$ (Carry into $m = \phi 6$ is always 1)

RECOVERY PROGRAM (ADD-ONE) REGISTER (RPR)

Figure 29:
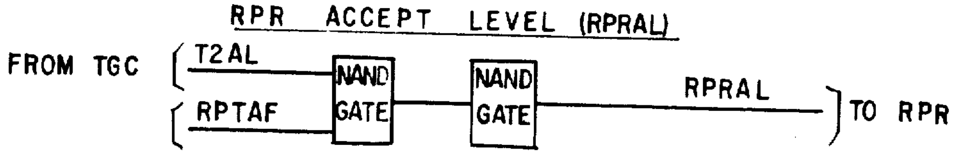
FIG. 29 is a logic circuit schematic of a Recovery Program Timer Accept Level Circuit.
Figure 30:
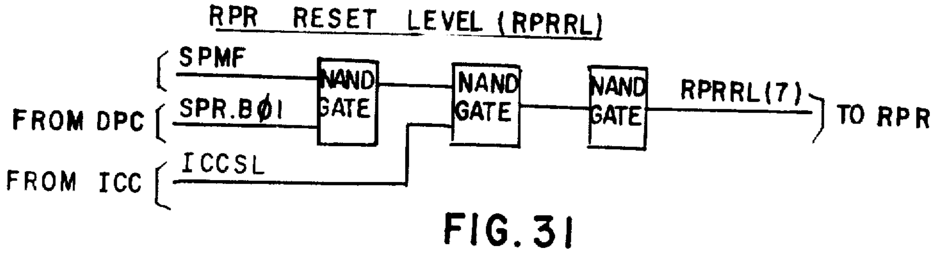
FIG. 30 is a logic circuit schematic of a Recovery Program Register Reset Level Circuit.
Figure 32:
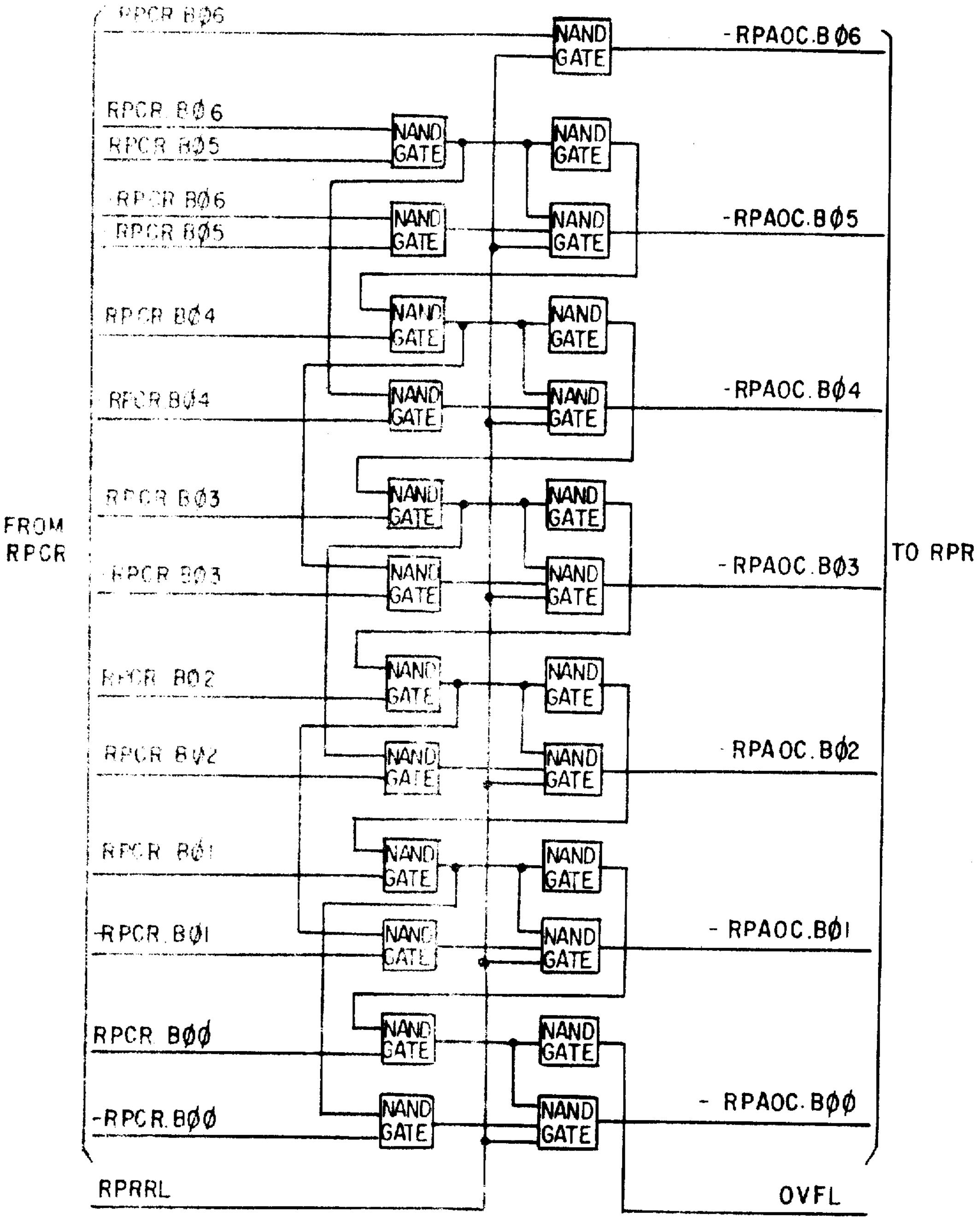
FIG. 32 is a logic circuit schematic of the Recovery Program Counter ADD/ONE Circuit.
Figure 33:
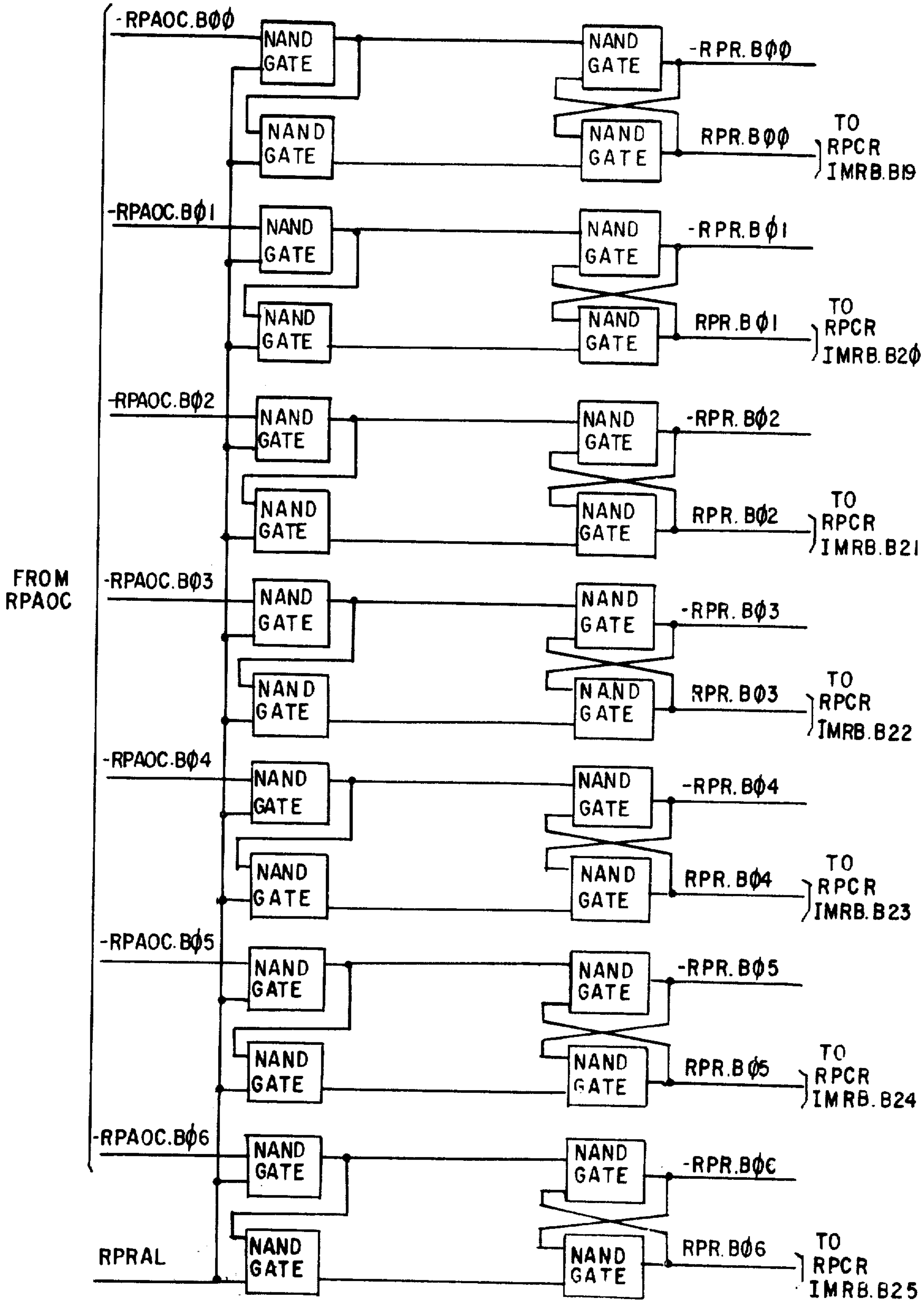
FIG. 33 is a logic circuit schematic of the Recovery Program Register.

The RPR 99 comprises seven D-type Flip-flops as shown in FIG. 33. The output of each bit is designated RPR.Bϕϕ through RPR.Bϕ6. When RPTAF = 1, the RPR accepts signals during T2AL which signals are either the output of RPAOC (when RPRRL = 1) or all 0's (when RPRRL = 0), as seen in FIG. 32. The accept circuitry is shown in FIG. 29. The conditions under which the RPR is reset (when RPRRL = 0) will be explained presently. The reset circuitry is shown in FIG. 30. The set outputs of the RPR 99 are fed to the inputs of the Recovery Program Counter Register 97. Also, the true or set outputs are sensed by MAC. The reset RPR outputs feed the Control Logic Circuit including a tree of NAND gates 105 of FIG. 25.

Accept Control: $RPRAL = RPTAF \cdot T2AL$

CONTROL LOGIC CIRCUIT (CLC)

Figure 34:
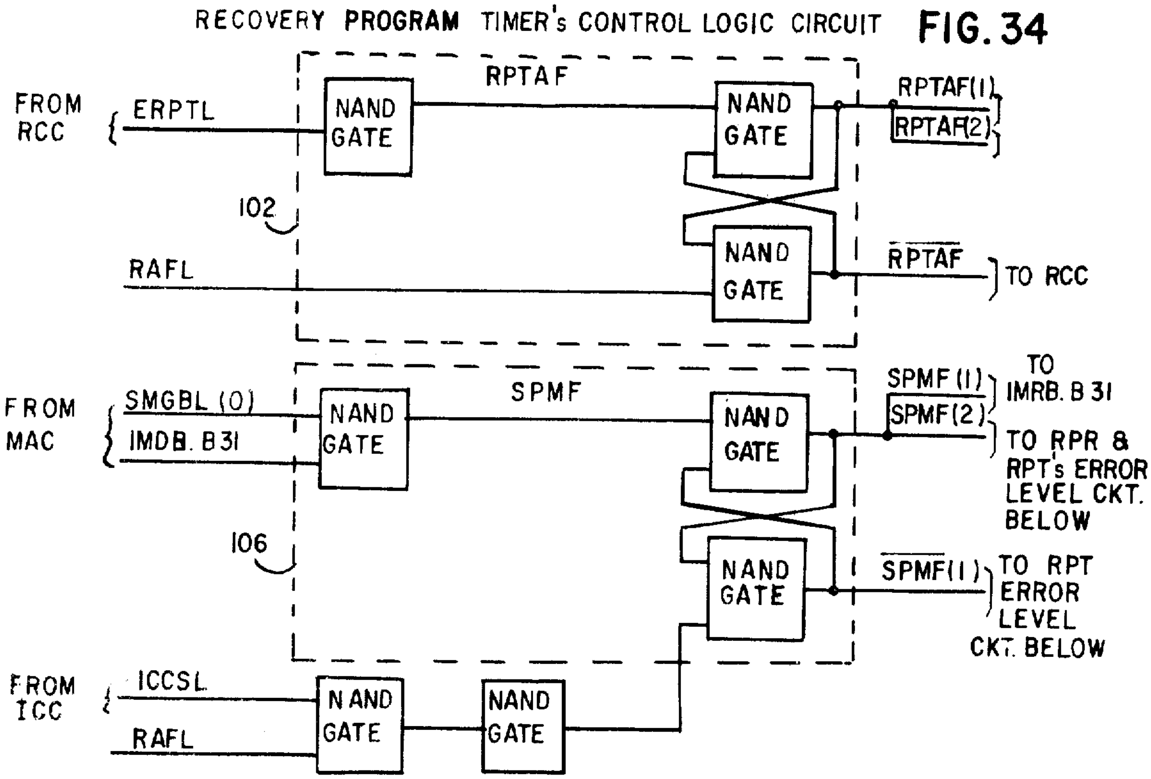
FIG. 34 is a logic circuit schematic of the RPT Control Logic.
Figure 35:
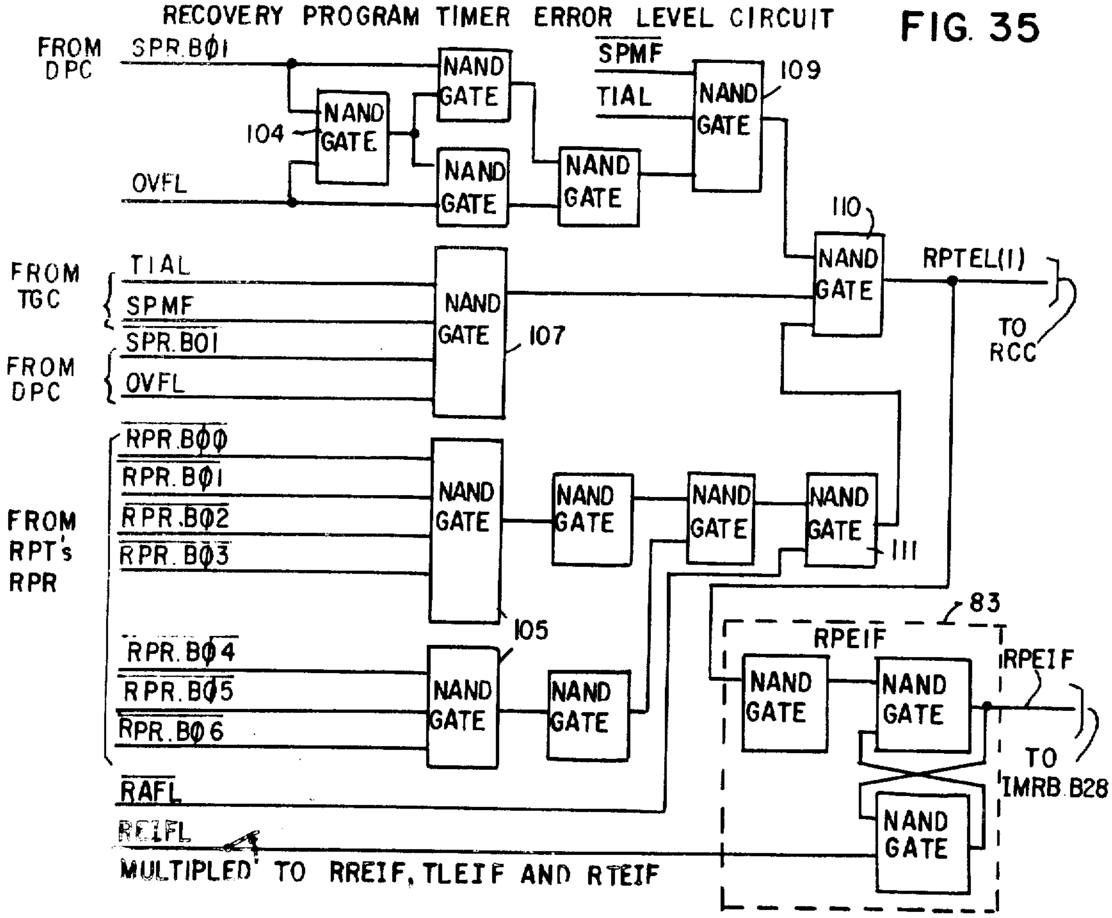
FIG. 35 is a logic schematic diagram of the RPT Error Level Circuit.
Figure 36:
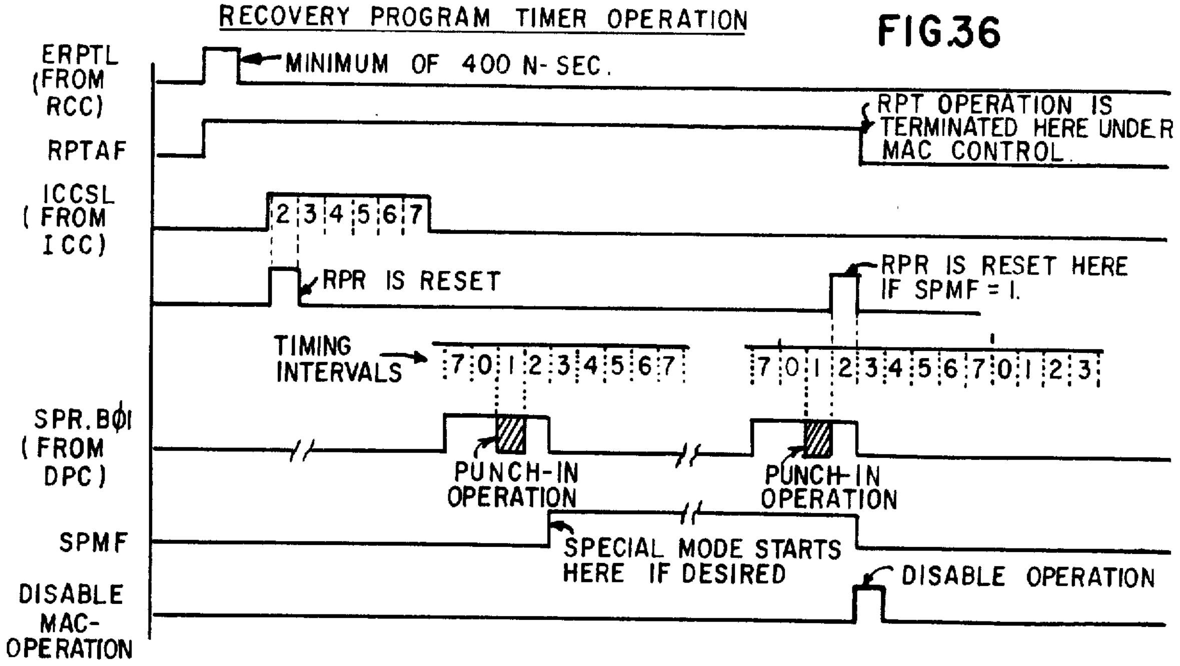
FIG. 36 is a timing diagram illustrating the operation of the RPT.
Figure 37:
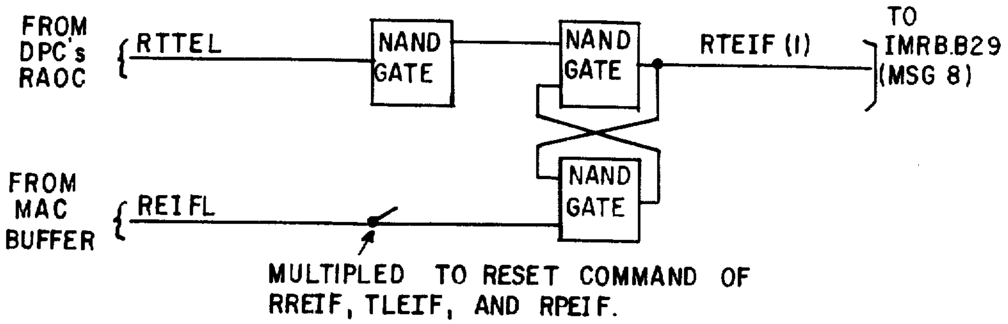
FIG. 37 is a logic schematic diagram of the Real-time Timer Error Indicator Flip-flop.
Figure 38:
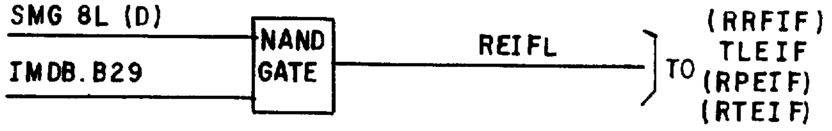
FIG. 38 is a logic schematic diagram of the Error Indicator Flip-flop Reset Control Circuit.

The CLC for the Recovery Program Timer 75 comprises three SR type Flip-flops: RPTAF, designated 102 in FIG. 25 and shown separately in FIG. 34; SPMF, designated 106 in FIG. 25 and also shown in FIG. 34; and RPEIF, designated 83 in FIGS. 13, 25 and also shown in FIG. 35. The Control Logic Circuit also includes a combinational circuit which generates the RPT Error Level (RPTEL); this circuitry is shown in FIG. 35.

a. RPTAF (Recovery Program Timer Activity Flip-flop)

The RPTAF 102 is a SR (set/reset) type Flip-flop. The RPTAF must be set to activate RPT. To set RPTAF, the RCC generates the signal ERPTL = 1 (Enable Recovery Program Timer Level). The RPTAF remains set during all recovery programs. It can be reset only under MAC control when the DISABLE operation described below is performed. The RPTAF feeds RCC to indicate the active status of RPT and it feeds CLC for gating functions. The output can also be sensed by MAC.

To set: ERPTL = 1

To Reset: MAC Control (MCG8.B3ϕ)

b. SPMF (Special Mode Flip-flop)

The SPMF 106 is also a SR type Flip-flop. It can be set only under MAC control immediately following any PUNCH-IN operation, as will be described presently. The SPMF feeds a flip-flop 107 (FIG. 25) and a NAND gate 108 which feeds the Recovery Program Add-One Circuit 98.

To Set: MAC Control (MCG8.B31)

To Reset: MAC Control (MCG8.B3ϕ) v ICCSL c. RPTEL (Recovery Program Timer Error Level)

The RPTEL = 1 when an error condition exists. The error consists of three conditions as follows:

$$RPTEL = T1AL \cdot \overline{SPMF} \cdot SPR.B\phi 1 \oplus OVFL) \cdot RPTAF$$
$$v\ T1AL \cdot SPMF \cdot SPR.B\phi 1 \cdot OVFL$$
$$v\ (MCG8.B3\phi) \cdot [RPR.B\phi\phi\ v\ RPR.B\phi 1\ v\ RPR.B\phi 2\ v\ RPR.B\phi 3\ v\ RPR.B\phi 4\ v\ RPR.B\phi 5\ v\ RPR.B\phi 6]$$
$$v\ RPTAF \cdot (MCG8.B31) \cdot [RPR.B\phi\phi\ v\ RPR.B\phi 1\ v\ RPR.B\phi 2\ v\ RPR.B\phi 3\ v\ RPR.B\phi 4\ v\ RPR.B\phi 5\ v\ RPR.B\phi 6\ ]$$

where,

SPMF = 1, RPT is operating in Special mode.

SPMF = 0, RPT is operating in Normal mode.

SPR.Bϕ1 = 1, PUNCH-IN command.

OVFL = 1, Carry from the highest order bit of RPAOC is true. It means that RPCR contains binary value of 127 (or all 1's).

The first condition is sensed by NAND gate 109 which feeds gate 110 to generate RPTEL. The second condition is sensed by gate 107 which also feeds gate 110. The third condition is sensed by gate 111 which receives the outputs of gates 105 and the signal $\overline{RAFL}$, and feeds gate 110. The third condition is sensed by gate 112.

MCG8.B3ϕ is the DISABLE operation command.

The RPTEL feeds RCC 29 and RPEIF 83.

d. RPEIF (Recovery Program Timer Error Indicator Flip-flop)

The RPEIF 83 is a SR type Flip-flop. It is fed by RPTEL and it stores the error indication for sensing by MAC. Once set, it remains set until reset under MAC control.

To Set: RPTEL = 1

To Reset: MAC Control (MCG8.B29)

RECOVERY PROGRAM TIMER OPERATION

Referring to FIG. 25, the RPT is activated for operation by RCC 29 under an interrupt condition for the purpose of monitoring the CP's performance in the execution of any recovery program. The RCC activates the RPT by providing ERPTL = 1 which sets RPTAF 102.

The ICCSL (Interrupt Control Circuit Sequence Level from ICC) initializes RPAOC 98, and RPTAF initializes RPR 99 by resetting its contents to all O's during T2AL. The CP's access to an interrupt address is made during this cycle. When an interrupt is originated from the ICC 28, the ICCSL precedes ERPTL by approximately 200 nanoseconds. When an interrupt is originated from the RCC, the ERPTL is followed by ICCSL.

Once initialized, the RPT counts (0 through 127) the number of instructions executed by a recovery program is basic order time in its hardware counter, RPCR 97. The RPT 99 counter may repeat counting as many times as is necessary. All recovery programs are required to PUNCH-IN at predetermined time intervals, the RPT checks each PUNCH-IN (disclosed in more detail below) for a satisfactory operation. When an illegal PUNCH-IN operation occurs, the RPTEL becomes true and triggers RCC to request a system recovery program. The punch in requirement insures that the recovery program is being properly executed.

Figure 31:
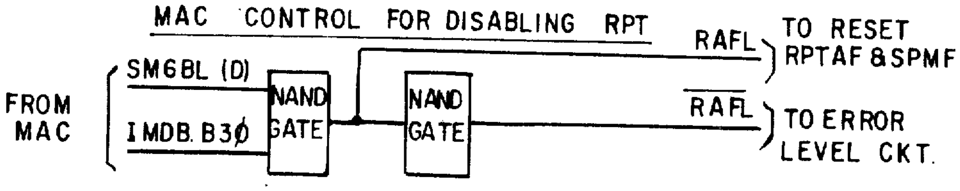
FIG. 31 is a logic circuit schematic of MAC control for disabling RPT.

To terminate the RPT operation, upon a satisfactory completion of its CP's recovery program execution, the DISABLE operation is performed under MAC Control. The DISABLE operation resets RPTAF and SPMF thereby returning the RPT to inactive status. The circuitry for performing the DISABLE function is shown in FIG. 31.

PUNCH-IN OPERATION IN NORMAL MODE

Figure 26:
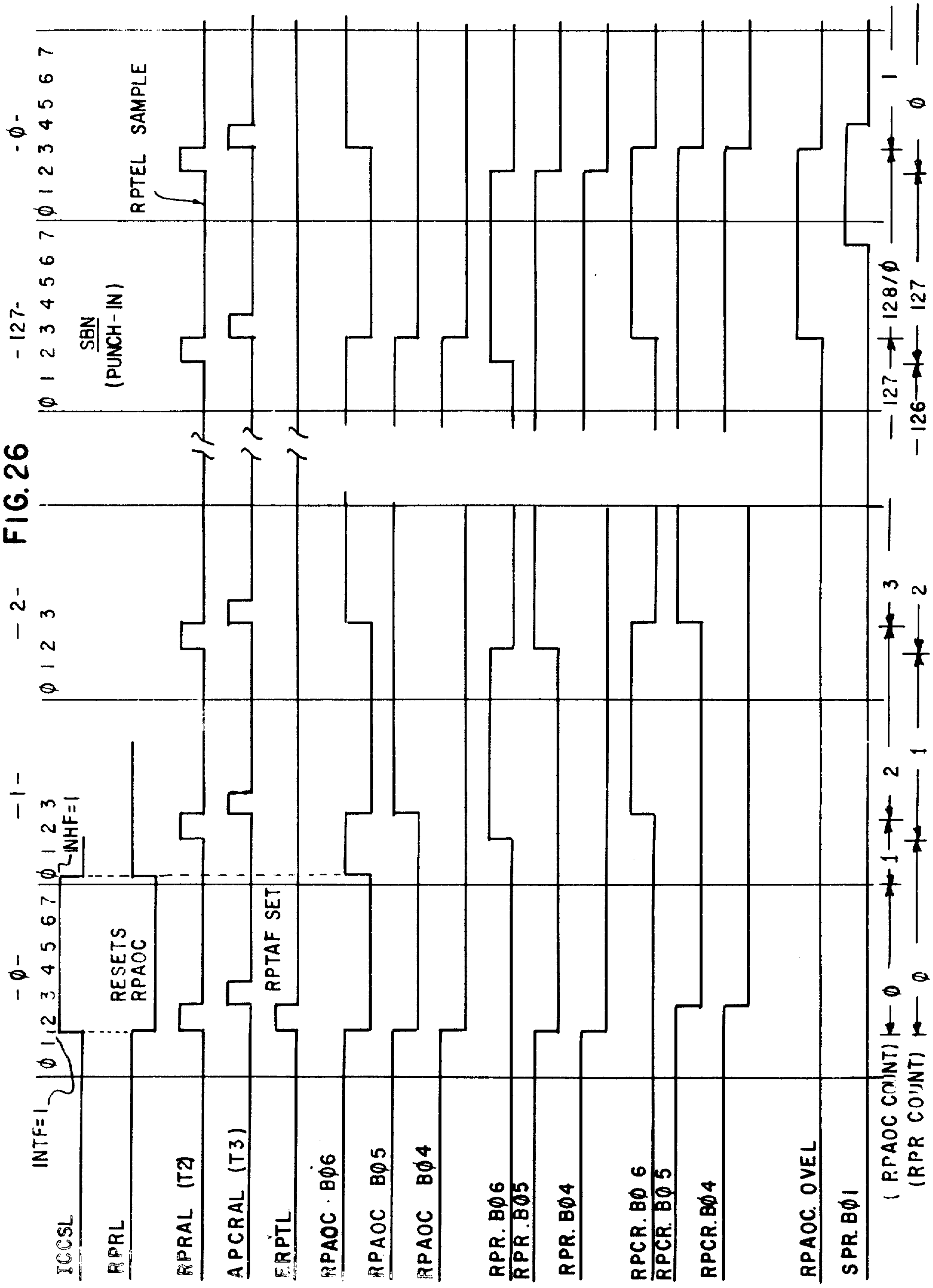
FIG. 26 is a timing diagram for the RPT of FIG. 25.

The RPT operation always begins in normal mode with SPMF = 0. All recovery programs, in this mode, must PUNCH-IN (i.e., execute the instruction SBN-1, 0, SPR) every 128th BOT (basic order time) and the hardware check is performed during T1AL of the following cycle. A timing diagram for the complete operation, including sampling for the PUNCH-IN is shown in FIG. 26.

Since, $$\begin{aligned}RPTEL = {} & T1AL\cdot\overline{SPMF}\cdot SPR,B\phi 1 \oplus OVFL)\cdot RPTAF\\ & v\ T1AL\cdot SPMF\cdot SPR.B\phi 1\cdot OVFL\\ & v\ (MCG8.B3\phi\cdot[RPR.B\phi\phi\ v\ RPR.B\phi 1\ v\ RPR.B\phi 2\\ & v\ RPR.B\phi 3\ v\ RPR.B\phi 4\ v\ RPR.B\phi 5\ v\ RPR.B\phi 6\ ]\\ & v\ (MCG8.B31)\ (RPTAF)\ [RPR.B\phi\phi\ v\ RPR.B\phi 1\\ & v\ RPR.B\phi 2\ v\ RPR.B\phi 3\ v\ RPR.B\phi 4\ v\ RPR.B\phi 5\\ & v\ RPR.B\phi 6]\end{aligned}$$

in normal mode (SPMF = 0):

$$SPR.B\phi 1 \oplus OVFL = 0$$

if the PUNCH-IN and OVFL both occur at the same time. The PUNCH-IN operation is valid and therefore RPTEL will not become true.

PUNCH-IN OPERATION IN SPECIAL MODE

The special mode of the RPT operation can be entered into only under MAC control by setting SPMF 106 to 1. The MAC operation is set SPMF must be performed immediately following any PUNCH-IN operation except the last PUNCH-IN operation of all recovery programs. In the special mode, the PUNCH-IN operation by all recovery programs is permitted to occur either at every 128th BOT or sooner (i.e., not later than the 128th BOT). When the PUNCH-IN operation occurs sooner than 128 BOT intervals, the RPR is reset during T2AL of the cycle that follows execution of the instruction, SBN SPR.Bφ1. (SBN 1, 0, SPR).

Once the RPT is in the special mode, the RPT operation remains in this mode until the operation is terminated by the DISABLE operation which also resets SPMF to 0. The ICCSL = 1 also resets SPMF to 0 when RPRAL = 1.

The RPT hardware checks for the following conditions.

Since, $$\begin{aligned}RPTEL = {} & T1AL\cdot\overline{SPMF}.(SPR.B\phi 1 \oplus OVFL)\cdot RPTAF\\ & v\ T1AL\cdot SPMF\cdot SPR.B\phi 1.OVFL\\ & v\ (MCG8.B3\phi)\cdot[RPR.B\phi\phi\ v\ RPR.B\phi 1\ v\ RPR.B\phi 2\\ & V\ RPR.B\phi 3\ v\ RPR.B\phi 4\ v\ RPR.B\phi 5\ v\ RPR.B\phi 6]\\ & v\ (MCG8.B31)\ (RPTAF)\cdot[RPR.B\phi\phi\ v\ RPR.B\phi 1\\ & v\ RPR.B\phi 2\ v\ RPR.B\phi 3\ v\ RPR.B\phi 4\ v\ RPR.B\phi 5\\ & v\ RPR.B\phi 6]\end{aligned}$$

In special mode (SPMF = 1):

When PUNCH-IN Command is absent, the OVFL must not be true.

If above conditions are satisfied during PUNCH-IN operation, no error signal is produced.

DISABLE OPERATION

Referring to FIG. 31, the DISABLE operation is performed, under MAC Control, upon successful completion of a recovery program. This operation resets RPTAF 102 and SPMF 106 and restores the RPT 75 to inactive status. The satisfactory terminations of the RPT operation requires that RPR contains all 0's when the DISABLE operation is performed (in other words, it should follow immediately a PUNCH-IN instruction). When this condition is not satisfied, the RPTEL becomes true and triggers the RCC requesting a system recovery program. The condition to be satisifed during the DISABLE operation is:

$$RPR.B\phi\phi = RPR.B\phi 1 = RPR.B\phi 2 = RPR.B\phi 3 = RPR.B\phi 4 = RPR.B\phi 5 = RPR.B\phi 6 = 0$$

$$MCGB.B3\phi = 1$$

Any condition contrary to the requirements shown above will trigger RPTEL to become true, and thereby generate an alarm signal.

HARDWARD-SOFTWARE INTERFACE a. PUNCH-IN Operation

To PUNCH-IN, the recovery programs execute the following instruction which sets SPR.Bφ1:

SBN Z, YH, SPR (Z+YH designates Bφ1 of SPR).

b. SPMF Control

The RPT may operate in normal mode or in special mode depending on the recovery program which can set SPMF if the recovery program must PUNCH-IN in special mode. The following MAC instruction can be used to set SPMF:

WMCP MCG8 31.

The SPMF can be reset under MAC control when the DISABLE operation is performed.

b. DISABLE Operation

To terminate the RPT operation upon completion of a recovery program, the DISABLE operation is performed under MAC Control. The DISABLE operation resets RPTAF and SPMF, and finally performs RPT check functions. To perform DISABLE operation, the following MAC instruction should be executed:

WMCP MCG8 3φ.

d. RPEIF Reset Control

The RPEIF can be reset only under MAC control which also resets RREIF, TLEIF, RTEIF. The MAc instruction is:

WMCP MCG8 29.

MAINTENANCE CONSIDERATION (RPT)

MAC Sense Points

The MAC has access to the following sense points of both the active CP and the standby CP by executing the instruction as follows:

RMSG MSG8, X.

The Sense points are:

RPTAF = MSG8.B3φ

SPMF = MSG8.B31

RPEIF = MSG8.B28

RPR.Bφφ = MSG8.B19

RPR.Bφ1 = MSG8.B20

RPR.Bφ2 = MSG8.B21

RPR.Bφ3 = MSG8.B22

RPR.Bφ4 = MSG8.B23

RPR.Bφ5 = MSG8.B24

RPR.Bφ6 = MSG8.B25

ROUTINING OF THE RPT

The RPT in the Standby CP can be routined by the active CP by allowing the standby CP to generate the ERPTL signal in its RCC and activate the RPT with CPSPF = 1. Following this, a MAC operation can be performed to generate an error condition in ICC. The ICC has activates ICCSL to true and initializes the RPT. The manner in which the RPT is to be routined can be left to the discretion of programmers. The programmers may perform PUNCH-IN operations at proper sequnces to routine check or improper sequences to produce an error condition. They may routine in normal mode or in special mode, or they may perform the DISABLE operation. During or after the routing, the MAC sense points may be interrogated to determine the sanity of the RPT.

REAL-TIME TIMER ERROR INDICATOR FLIP-FLOP (RTEIF)

The RTEIF designated 83 in FIGS. 13 and 25 is a SR type Flip-flop. It constantly monitors the Real-Time Timer (RTT) located in DPC. It is fed by the Real-Time Timer Error Level (RTTEL — carry from RAOC.Bφ2). The RTEIF can be sensed by MAC, and it can be reset only under MAC control.

To sense the RTEIF, execute the instruction:

RMSG MSG8, X: (GRX.B29).

To reset the RTEIF, execute the instruction:

WMCG MSG8, 29.

INPUT/OUTPUT OF TMC

Inputs to TMC

| FROM | MNEMONIC | DESCRIPTION |
|---|---|---|
| | TφPL | |
| | T1PL | |
| | T2PL | |
| | T3PL | |
| | T4PL | |
| | T5PL | |
| | T6PL | |
| TGC | T7PL | Input to TLCC Counter |
| | TφAL | |
| | T1AL | |
| | T2AL | Used for gating RPR |
| | T3AL | Used for gating RPCR; used in TLCC. |
| | T4AL | used in TLCC. |

Inputs to TMC-Continued

| FROM | MNEMONIC | DESCRIPTION |
|---|---|---|
| | T5AL | |
| | T6AL | |
| | T7AL | |
| | CPACL | Resets TLCC Counters |
| | ITCCL | Resets TLCC Counters |
| | SMG8L[D] | Select MCG8 |
| MAC | IMDB.B29 | Reset RREIF, TLEIF, RPEIF, RTEIF |
| | IMDB.B3φ | DISABLE Operation; Resets RPTAF and SPMF of RPT |
| | IMDB.B31 | Set SPMF of RPT |
| ICC | ICCSL | Resets SPMF and RPR during T2AL |
| RCC | ERPTL | Set RPTAF of RPT |
| DPC | RTTEL | Set RTEIF |
| | SPR.Bφ1 | PUNCH-IN Operation Command |
| CCC | DCPAL | Gates out RREL and TLEL |

TMC Output

| TO | MNEMONIC | DESCRIPTION |
|---|---|---|
| | RREL | RRCC Error Level |
| RCC | TLEL | TLCC Error Level |
| | RPTEL | RPT Error Level |
| | RPTAF | RPT Activity Level |
| | IMRB.B15 PEBCF | |
| | IMRB.B16 POBCF | TLCC Counter Flip-flop Output |
| | IMRB.B17 AEBCF | |
| | IMRB.B18 AOBCF | |
| | IMRB.B19 RPR.Bφφ | |
| | IMRB.B2φ RPR.Bφ1 | |
| MAC | IMRB.B21 RPR.Bφ2 | |
| | IMRB.B22 RPR.B03 | RPT's RPR output |
| | IMRB.B23 RPR.B04 | |
| | IMRB.B24 RPR.B05 | |
| | IMRB.B25 RPR.B06 | |
| | IMRB.B26 RREIF | RRCC Error Indicator Flip-flop |
| | IMRB.B27 TLEIF | TLCC Error Indicator Flip-flop |
| | IMRB.B28 RPEIF | RPT Error Indicator Flip-flop |
| | IMRB.B29 RTEIF | RTT Error Indicator Flip-flop |
| | IMRB.B30 RPTAF | RPT Activity Flip-flop |
| | IMRB.B31 SPMF | RPT's Special Mode Flip-flop |

We claim:

1. A recovery program timer system for a data processing system having a central data processor including processing circuits and maintenance circuits, an interrupt control circuit for generating an interrupt control circuit sequence level signal to start an interrupt cycle, and a recovery control circuit for generating an enable recovery program timing level signal when a recovery program is called, said timer responsive to said enable recovery program timing level signal to initiate a recovery program cycle, said timer comprising:

recovery program register means for accumulating and storing signals representative of a count of machine cycles of said central processor;

incrementing circuit means for incrementing the stored count signals in said recovery program register means each cycle time of said sentral processor, including overflow signal producing means, said interrupt control circuit sequence level signal initializing the incrementing circuit means to zero count;

recovery program timer bistable circuit means responsive to said enable recovery program timing level signal for actuating said recovery program register means; and logic circuit means responsive to a recovery program punch-in signal and said overflow signal from said incrementing circuitry for generating a recovery program timing error level signal only if said punch-in signal and said overflow signal do not occur at the same time when said recovery program timer is operating in a normal mode.

2. The system of claim 1 further comprising:

real time timer means for accumulating and storing signals representative of the lapse of real time during the execution of non-recovery program in said central processor.

3. The system of claim 1 wherein said recovery program timer further comprises special mode bistable circuit means responsive to a programmed signal for enabling said punch-in bit to occur at any time prior to a predetermined number of machine cycle times, thereby to reset said recovery program timer without generating said recovery program timer error level signal.

4. The system of claim 1 wherein said central processor further comprises real time timer circuit means for accumulating signals representative of a real-time count of machine cycle times during the execution of non-recovery programs in said processor and for generating a real time timer error level signal when a predetermined number of machine cycles have occurred without program resetting; and real time error bistable means responsive to said real time timer error level signal for generating an output error signal representative thereof.

5. The system of claim 4 wherein said incrementing circuit means overflow signal producing means is responsive to the output of said register means and generates an overflow signal when a predetermined count is exceeded and wherein said logic circuit means comprises exclusive or logic circuit means responsive to said punch-in signal and said overflow signal of said incrementing circuit means.

6. The system of claim 1 wherein said incrementing circuit means comprises a recovery program counter register receiving the output of said recovery program register circuit means; and recovery program add one circuit means receiving the contents of said recovery program counter register for adding an increment of one thereto and for feeding the input of said recovery program register circuit means.

7. The system of claim 6 further comprising bistable circuit means for disabling said recovery program timer circuit means in response to a program instruction, said bistable circuit means being capable of disabling said recovery program timer circuit means in the normal mode only after a punch-in signal has occurred simultaneously with said overflow signal of said incrementing circuit means.

8. The system of claim 1 further comprising circuit means for generating a recovery program timer error level signal when said punch-in signal occurs in any machine cycle other than said overflow signal.

9. The system of claim 8 further comprising circuit means for generating said recovery program timer error level signal when said recovery program timer circuit means is reset prior to the end of a full recovery program cycle.

10. The system of claim 9 further comprising special mode circuit means responsive to a special mode signal under program control, for permitting said punch-in signal to occur prior to said overflow signal of said incrementing circuit means without generating said recovery program timer error level signal.

11. The system of claim 10 further comprising circuit means for generating said recovery program timer error level signal if said special mode circuit means is actuated at any time other than the end of a normal recovery program cycle.

* * * * *